(12) United States Patent
Mikiya et al.

(10) Patent No.: US 6,899,132 B2
(45) Date of Patent: May 31, 2005

(54) FLUID COUPLER

(75) Inventors: Toshio Mikiya, Tokyo (JP); Hiroyuki Kitagawa, Tokyo (JP)

(73) Assignee: Nitto Kohki Co., Ltd., Tokyo (JP)

(*) Notice: Subject to any disclaimer, the term of this patent is extended or adjusted under 35 U.S.C. 154(b) by 32 days.

(21) Appl. No.: 10/745,670

(22) Filed: Dec. 29, 2003

(65) Prior Publication Data

US 2004/0134544 A1 Jul. 15, 2004

(30) Foreign Application Priority Data

Dec. 27, 2002 (JP) ........................................ 2002-379582

(51) Int. Cl.[7] .............................................. F16L 37/28
(52) U.S. Cl. ................................ 137/616.7; 251/149.2; 251/149.9
(58) Field of Search ................... 137/616.7; 251/149.2, 251/149.9

(56) References Cited

U.S. PATENT DOCUMENTS 5,050,841 A * 9/1991 Jacobsson ................ 251/149.9
5,326,072 A * 7/1994 Wuthrich ................. 137/616.7
6,422,267 B1 * 7/2002 Makishima et al. ...... 137/616.7

FOREIGN PATENT DOCUMENTS

JP          2002-168387         6/2002

* cited by examiner

Primary Examiner—Kevin Lee
(74) Attorney, Agent, or Firm—Wenderoth, Lind & Ponack, L.L.P.

(57) ABSTRACT

A fluid coupler comprises a ball valve a through hole provided between a female coupler body and a valve holding casing connected to the female coupler body and surrounding the ball. The ball valve has a first flat sliding surface formed on a spherical outer surface of the ball valve which extends in a direction normal to a rotational axis of the ball valve, and a flat stop surface raised from the first flat sliding surface and reaching said spherical outer surface of said ball valve, the first flat sliding surface and the flat stop surface together defining a recess. The valve holding casing has an alignment portion formed on and raised from an interior surface thereof. The alignment portion has a second flat sliding surface slidably engaged with said first flat sliding surface. The flat stop surface is adapted to engage with the alignment portion to limit the rotational movement of the ball valve.

26 Claims, 28 Drawing Sheets

US 6,899,132 B2

FLUID COUPLER

BACKGROUND OF THE INVENTION

The present invention relates to a fluid coupler.

There is known in the art a fluid coupler comprising male and female couplers. The fluid coupler includes a ball valve which is rotatable between an angular receiving position and an angular securing position for the male coupler. To connect the male to the female coupler, the male coupler is first inserted into a through hole of the ball valve which is in its angular receiving position, and the ball valve is then rotated to its angular securing position for the male coupler, to provide a secure connection between the male and female couplers.

FIG. 28 shows fluid coupler disclosed in Japanese patent application 2002-168387A, and which is of the type described above. As shown, this fluid coupler 1 has a female coupler 1 and a male coupler 2 adapted to be inserted into and connected to the female coupler 1. The female coupler includes a cylindrical coupler body 8 having a through hole 5. The female coupler 1 further has a ball valve 4 including a through hole 3 extending along a diameter thereof, and a valve holding casing 9 having an inverse cup shape, and which is disposed around the ball valve 4 and threadably connected to the cylindrical coupler body 8 to rotatably hold the ball valve 4. In the through hole 5 of the cylindrical coupler body B, there is provided a cylindrical sealing member 6 having a spherical end surface for slidable engagement with the ball valve 8.

The male coupler 2 has an extending cylindrical male member 11 of a small diameter and adapted to be inserted into and connected to the female coupler 1. The cylindrical male member 11 is adapted to be inserted into the through hole 3 of the ball valve 4 in its angular receiving position (FIG. 28). In this position, the through hole 3 of the ball valve 4 is at an angle of about 45 degrees relative to a vertical line or an axis of the through hole 5 of the female coupler 1 and the through hole 5 is sealingly closed by the outer spherical surface of the ball valve 4. When the cylindrical male member 11 is completely inserted into the through hole 3 of the ball valve 4, a large diameter portion 11a of the cylindrical male member 11 is fitted into a cylindrical male member support 13 that is threadably engaged with the through hole 3 of the ball valve, and a forward end of the cylindrical male member 11 is sealingly engaged by a sealing sleeve 14, which is provided in the through hole 3, and is fastened by the male coupler support 13. The male coupler 2 inserted into the through hole 3 of the ball valve 4 is rotated together with the ball valve 4 in a clock-wise direction through about 45 degrees to bring into alignment a through hole 12 of the male coupler 2 and the through hole 3 of the ball valve 4 with the through hole 5 of the female coupler 1, respectively, whereby the female and male couplers 1 and 2 are brought into fluid communication. The ball valve holding casing 9 has an elongated through hole 10 extending from its left side, as viewed in FIG. 28, to its top or forward end portion. The elongated through hole includes a large width portion 10a which is positioned at the leftmost end of the elongated through hole 10 to allow the large diameter portion 11a of the cylindrical male member 11 to pass through the elongated through hole 10 into the through hole 3 of the ball valve 4; and also includes a remaining small width portion 10b extending from the large width portion 10 to the rightmost end of the elongated through hole 10, the width of which is slightly larger than the cylindrical male member 11 but smaller than the diameter of the large 3portion 11a of the cylindrical male member 11.

In the male coupler securing angular position, a locking sleeve 17 of the male coupler 2 is moved down or forwards to be brought into engagement with a locking portion 16 formed on the top or forward end of the valve holding casing 9, so as to prevent the male coupler 2 returning to its angular receiving position.

As shown, the ball valve 4 is provided with a pair of flat surfaces 4a and 4b which are in parallel with the rotational axis CL of the ball valve 4 and the ball valve holding casing 9 is provided in its interior with corresponding flat surfaces 9a and 9b. The flat surfaces 9a and 9b are adapted to engage with the flat surfaces 4a and 4b of the ball valve 4 when it is moved from the angular receiving position for the male coupler to the angular securing position for the male coupler. The ball valve 4 further has a flat surface (not shown) that is normal to the rotational axis CL; and the valve holding casing also has a flat surface for slidable engagement with the flat surface of the ball valve 4 to prevent the ball valve from rotating around any other axis than the rotational axis CL.

SUMMARY OF THE INVENTION

The object of the present invention is to provide improvements to the fluid coupler discussed above (hereinafter, referred to as "prior art fluid coupler"), such that the construction, sealing effect, and other features of the prior art fluid coupler are improved and simplified.

According to one aspect of the present invention, there is provided a fluid coupler comprising a female coupler and a male coupler, the male coupler being adapted to be inserted into the female coupler for connection therewith, the female coupler comprising:

a cylindrical coupler body having a first through hole extending from one of its ends to its other end, with one end of the through hole being adapted for connection with a conduit;

a ball valve including a second through hole, the ball valve being positioned at one end of the cylindrical coupler, and being rotatable about its central axis between a first rotational position, wherein one opening end of the second through hole is aligned with and fluidly connected to the first through hole, and a second rotational position, wherein the one opening end of the second through hole is not in alignment with and is fluidly disconnected from the first through hole; and a valve holding casing connected to the cylindrical coupler body, and disposed around the ball valve to rotatably hold it; the valve holding casing having an elongated through hole provided along a path along which the other opening end of the second through hole moves when the ball valve is rotated between its first and second positions, the elongated through hole allowing the male coupler to be inserted into the second through hole, which extends from the outside of the valve holding casing through the other opening end of the second through hole when the ball valve is in its second rotational position, and allowing the male coupler which has been inserted into the second through hole of the ball valve to move between the first and second rotational positions;

the ball valve having a first flat sliding surface formed on a spherical outer surface of the ball valve which extends in a direction normal to the rotational axis of the ball valve, and a flat stop surface raised from the first flat sliding surface and reaching the spherical outer surface of the ball valve, the first flat sliding surface and the flat stop surface together defining a recess;

the valve holding casing having an interior surface and an alignment portion formed on the interior surface, and positioned in the recess formed in the spherical outer surface of the ball valve, the alignment portion having a second flat sliding surface extending in parallel and slidably engaged with the first flat sliding surface of the ball valve;

the flat stop surface of the ball valve being adapted to engage with the alignment portion when the ball valve has been moved to one of the first and second rotational positions from the other of the first and second rotational positions to stop the rotational movement of the ball valve.

As will be apparent from the above description, the present invention makes it possible to control a rotational movement of the ball valve by utilizing a simple ball valve control means, which comprises the recess formed in the ball valve and the alignment portion formed on the interior surface of the valve-holding casing. This is in contrast to the prior art fluid coupler described above in which flat surfaces 4a, 4b, 9a, 9b band additional flat surfaces are provided on the interior surface of the valve holding casing and the exterior surface of the ball valve.

The ball valve may have an interior surface defining the second through hole and an irregular portion formed in the interior surface and a sealing sleeve coaxially provided on and securely held to the interior surface by interference-fit of the outer surface of the sealing sleeve with the irregular portion. The sealing sleeve is adapted to sealingly engage with the outer surface of the male coupler inserted into the second through hole. Unlike in the prior art fluid coupler, the sealing sleeve is fastened in the through hole of the ball valve without the need for any fastening member, such as the male support member 13 used in the prior art fluid coupler.

The cylindrical coupler body may comprise a valve sealing member positioned in the first through hole at the other opening end of the first through hole, and having a third through hole axially aligned with the first through hole. The valve sealing member has a valve support surface for supporting the ball valve which is provided with inner and outer annular raised sealing portions extending coaxially with the third through hole and sealingly engaged with the spherical outer surface of the ball valve positioned at the first rotational position. The inner and outer annular raised sealing portions are spaced apart from each other such that the third through hole can not extend from the radially outer side of the outer annular raised sealing portion to the radially inner side of the inner annular raised sealing portion, thereby avoiding leakage of the fluid in the first through hole via the third hole when the ball valve is rotated between its first and second rotational positions.

The first through hole of the coupler body may comprise a large diameter portion and small diameter portion, successively arranged from the one opening end towards another opening end, with a radially extending portion being provided between and connecting the large and small diameter portions; the large diameter portion receiving therein a valve sealing member having a third through hole axially aligned with the first through hole, with a spring being provided between the valve sealing member and the radially extending portion so as to urge the valve sealing member against the ball valve. In the prior art fluid coupler, sealing engagement between the valve sealing member and the ball valve is dependent on an elasticity of the valve sealing member which is compressed between the radially extending portion in the first through hole and the ball valve. However, a modulus of elasticity of the valve sealing member is susceptible to a decrease over a long working period; or under excessive heat or the like, resulting in the prior art fluid coupler in a deterioration in sealing engagement between the valve sealing member and the ball valve. In contrast, in the fluid coupler of the present invention, such deterioration is prevented by provision of the spring between the valve sealing member and the coupler body at its radially extending portion.

The valve holding casing may also be provided on its interior surface with a valve support member for engagement with the outer spherical surface of the ball valve, so as to cooperate with the valve support member and slidably hold the ball valve therebetween. By this configuration, a rate of wear of the ball valve and the interior surface of the valve holding casing is reduced comparative to the prior art fluid coupler.

The male coupler may also comprise a cylindrical male coupler cover fixedly mounted on and surrounding the male coupler, and a cylindrical locking member slidably mounted on the cylindrical male coupler cover in a coaxial relation such that the cylindrical locking member is movable between a securing position wherein it engages with the valve holding casing for prevention of movement of the male coupler inserted into the ball valve positioned at the first rotational position and a non-securing position wherein the cylindrical locking member disengages from the valve holding casing to allow the male coupler inserted into the ball valve to move between the first rotational position and the second rotational position. The cylindrical male coupler cover and the cylindrical locking member are preferably made from material which is resistant to adhesion of liquid such as paint which is transferred through the fluid coupler. In the prior art fluid coupler, a cylindrical locking member made from a metal is directly and slidably provided on the male coupler and, therefore, when the prior art fluid coupler is used for transferring paint, the paint may adhere to the cylindrical locking member and, when the paint sets, the cylindrical locking member becomes inoperable. The combination of the cylindrical male cover and the cylindrical locking member made from the material as stated above is effective in preventing such a defect.

The male coupler may have a rotation-prevention portion positioned between side edges defining the elongated hole of the valve holding casing when the male coupler is moved between the first and second rotational positions, and a cross section configured such that the rotation-prevention portion is prevented by the side edges from rotating around an axis thereof. This feature can prevent a twist in a conduit connected to the male coupler. Specifically, the cross section of the rotation-prevention portion has two parallel sides in parallel with the side edges to be slidably engaged with the side edges of the male coupler.

According to another aspect of the present invention, there is provided a fluid coupler which is substantially the same as the fluid coupler mentioned above except that the former employs a cylindrical valve in place of the ball valve. All characteristic features of the fluid coupler using the ball valve may be applied to the fluid coupler using the cylindrical valve with minor modifications.

BRIEF DESCRIPTION OF THE DRAWINGS

These and other features, aspects, and advantages of the present invention will become apparent with reference to the following description, claims and accompanying drawings, where

DETAILED DESCRIPTION OF THE INVENTION

Figure 17:
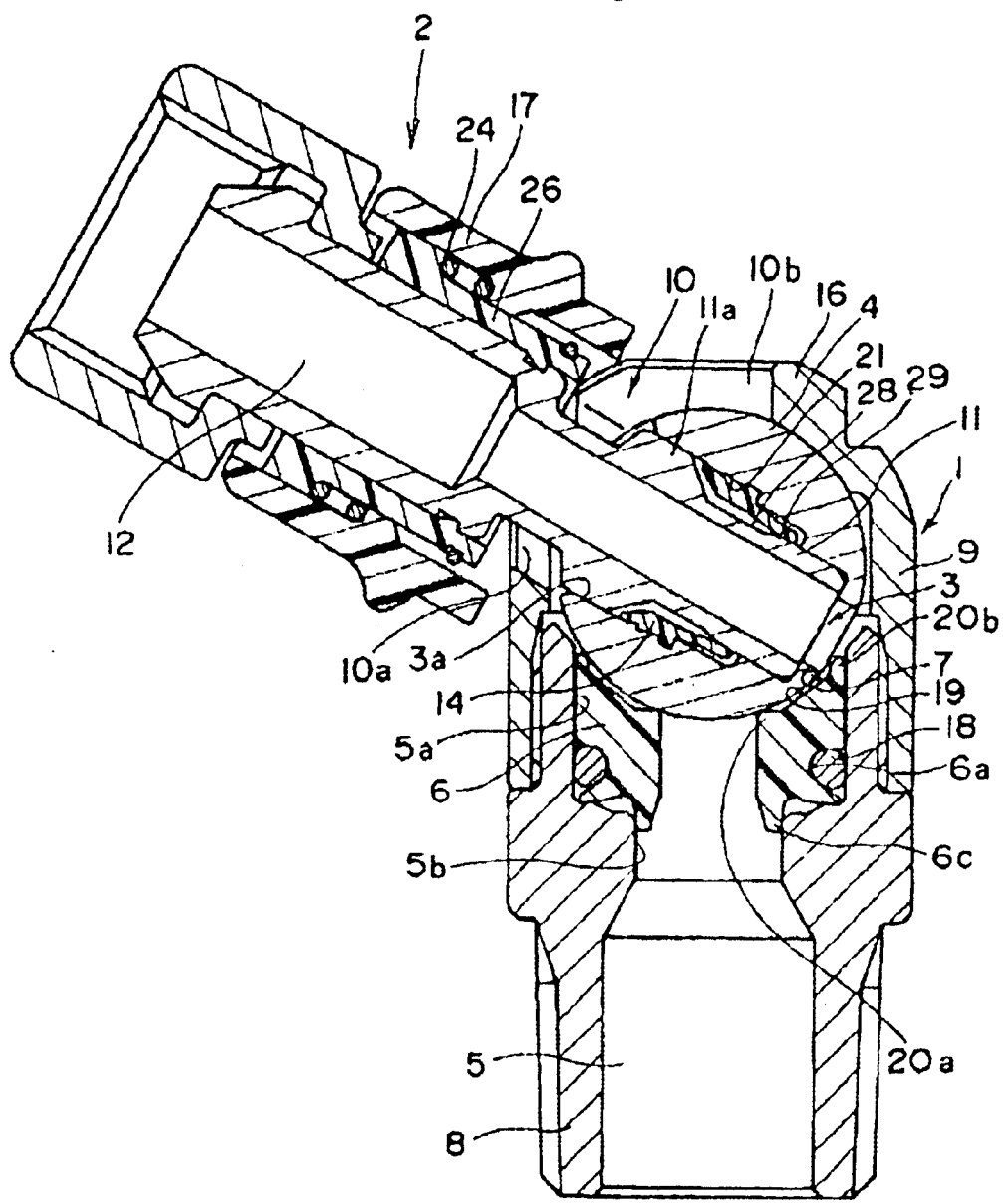
FIG. 17 is a longitudinal cross-sectional view of the fluid coupler showing the male coupler which has been inserted into the ball valve positioned at the male coupler receiving rotational position.

With reference to FIGS. 1–18, there is shown a fluid coupler in accordance with an embodiment of the present invention. As can best be seen in FIGS. 17 and 18, the fluid coupler has a female coupler 1 and a male coupler 2.

Figure 1:
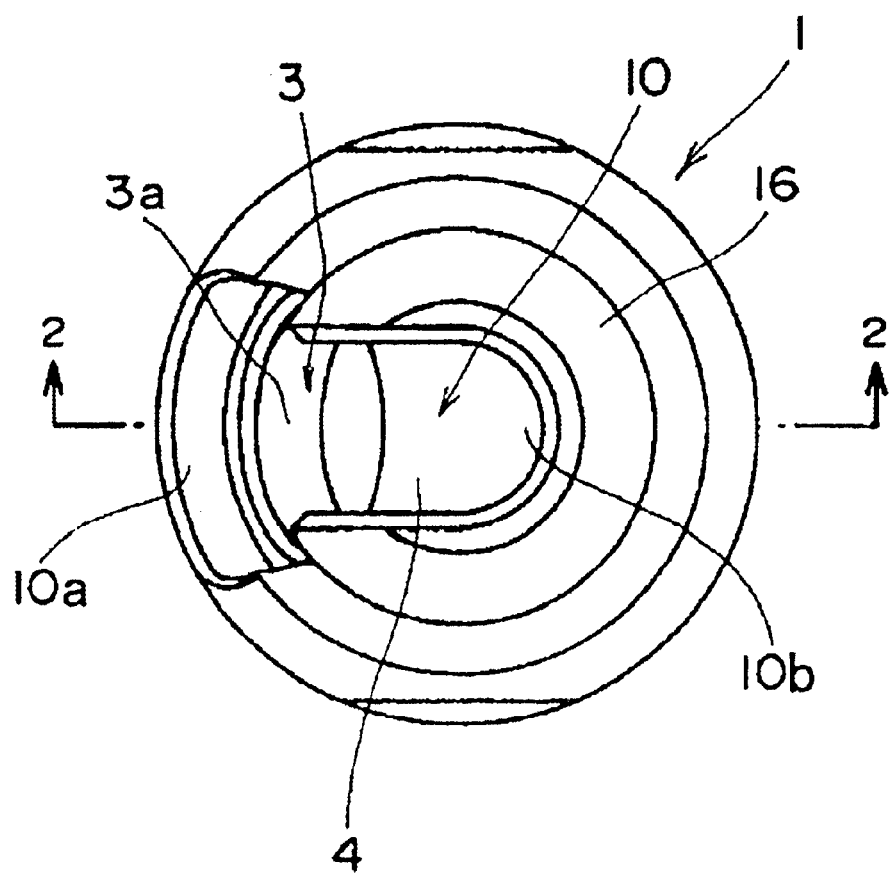
FIG. 1 is a plan view of a female coupler of a fluid coupler in accordance with the present invention.
Figure 2:
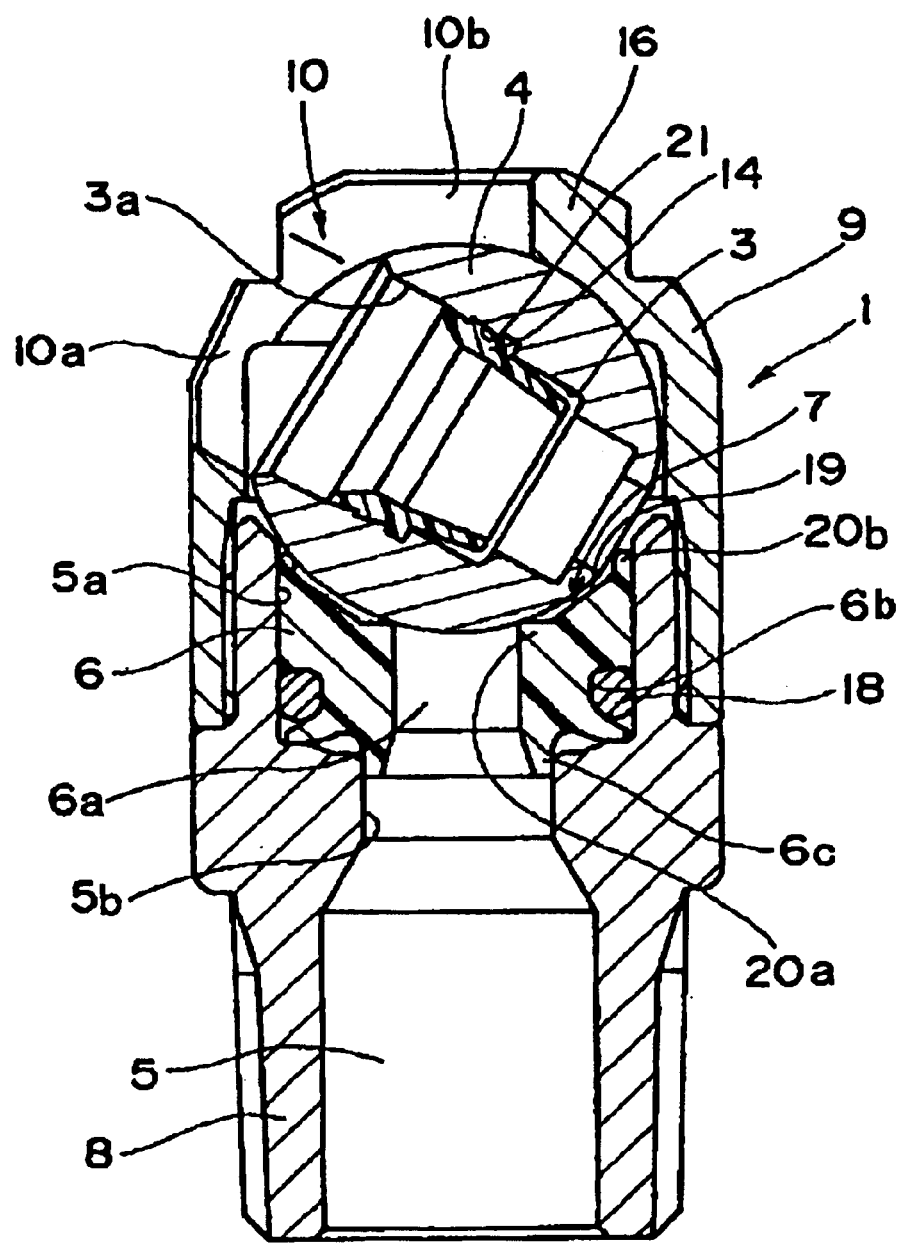
FIG. 2 is a view taken along a line 2—2 in FIG. 1.
Figure 3:
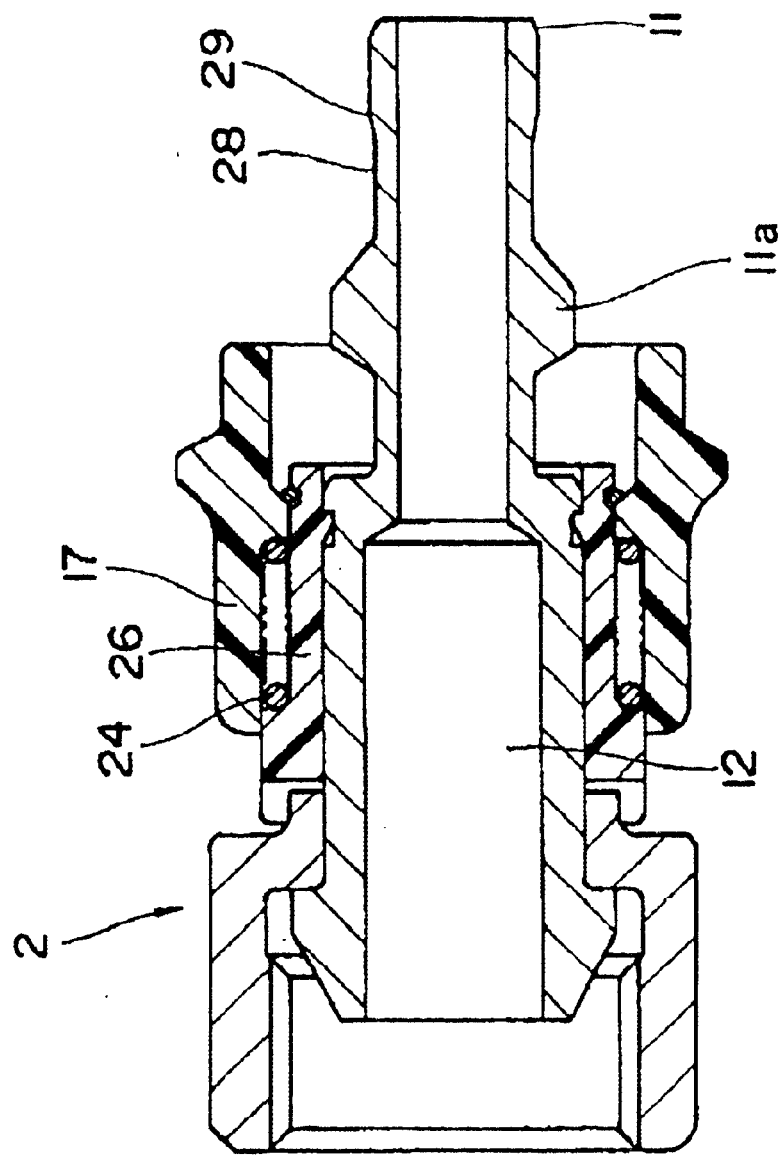
FIG. 3 is a longitudinal cross-sectional view of a male coupler of the same fluid coupler.
Figure 4:
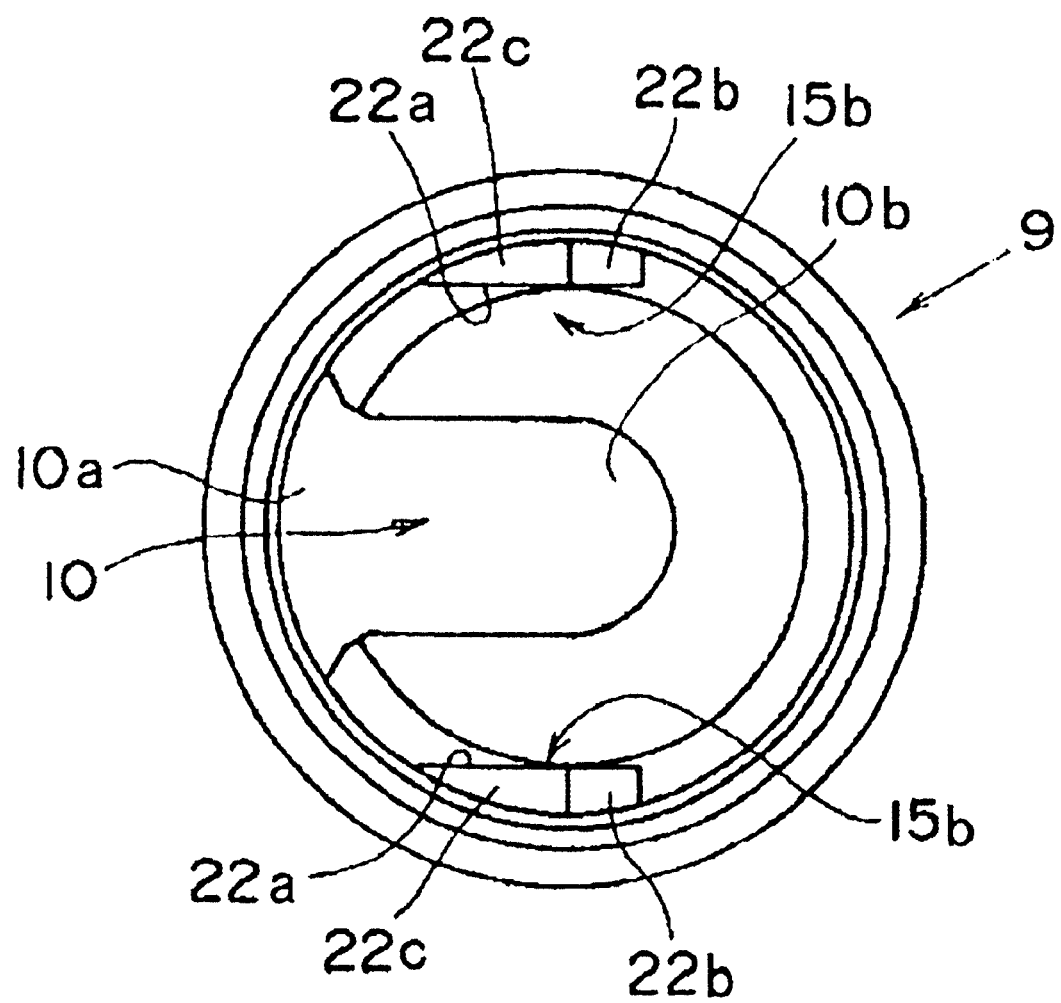
FIG. 4 is a bottom view of a valve holding casing of the fluid coupler.
Figure 5:
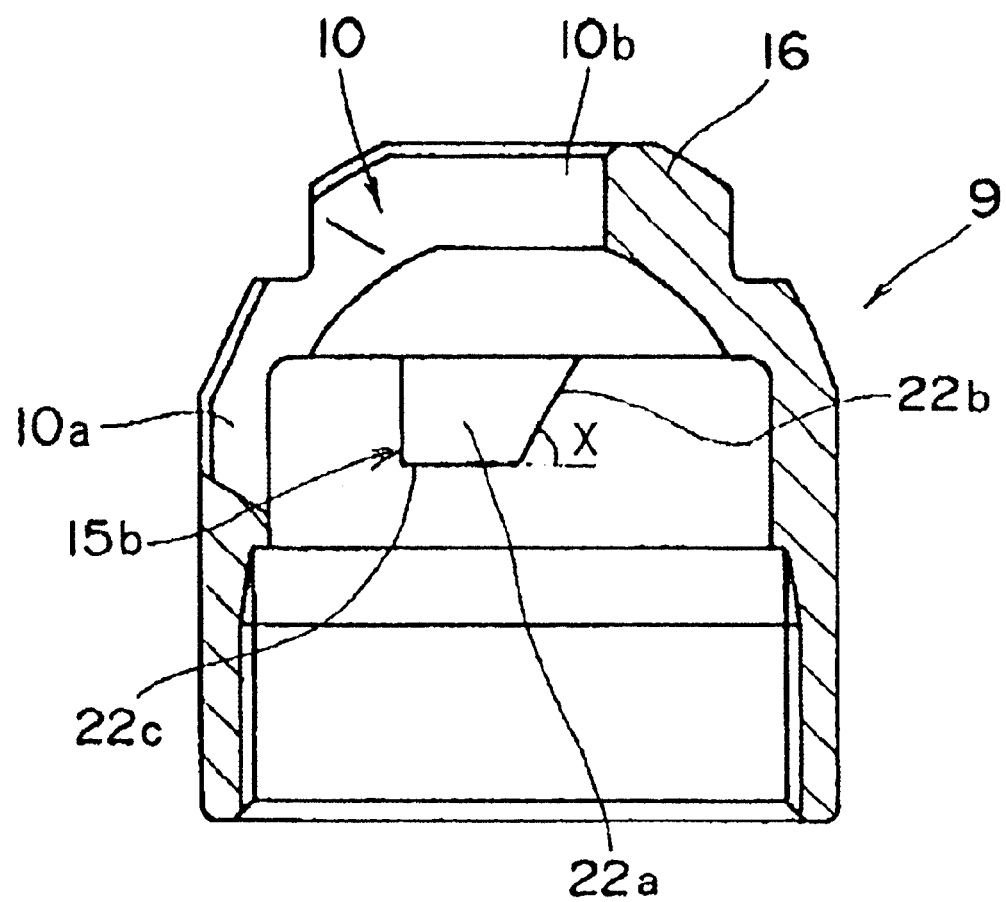
FIG. 5 is a longitudinal cross-sectional view of the valve holding casing.
Figure 6:
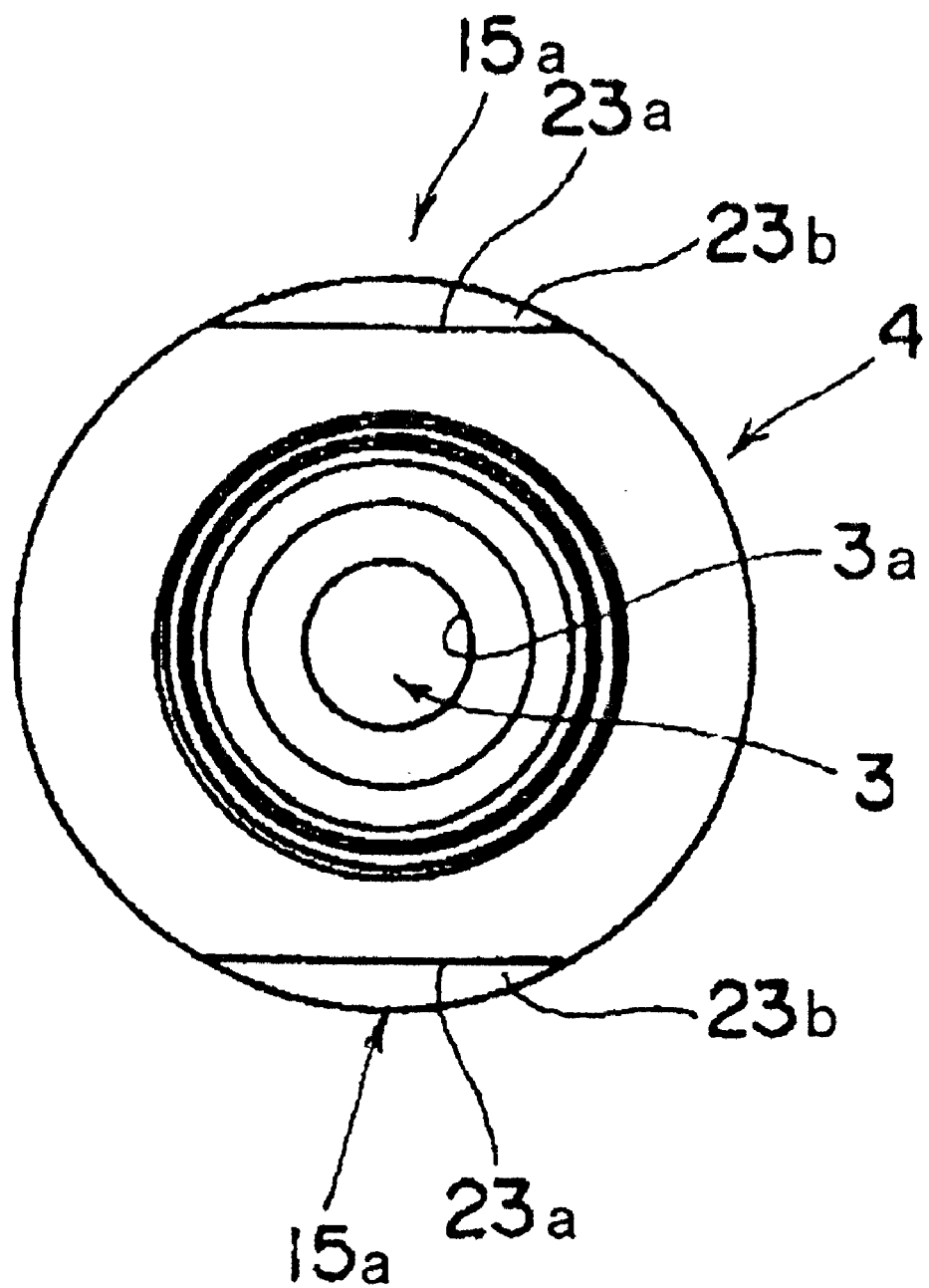
FIG. 6 is a plan view of a ball valve of the fluid coupler in accordance with the present invention.
Figure 7:
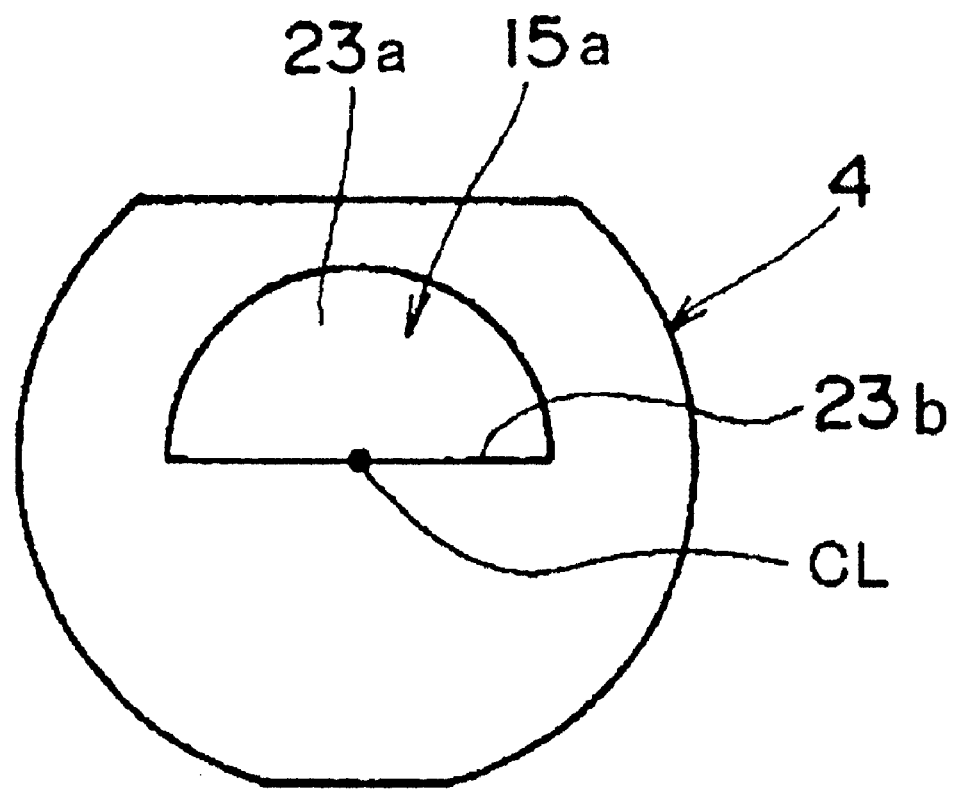
FIG. 7 is a side elevation view of the ball valve.
Figure 8:
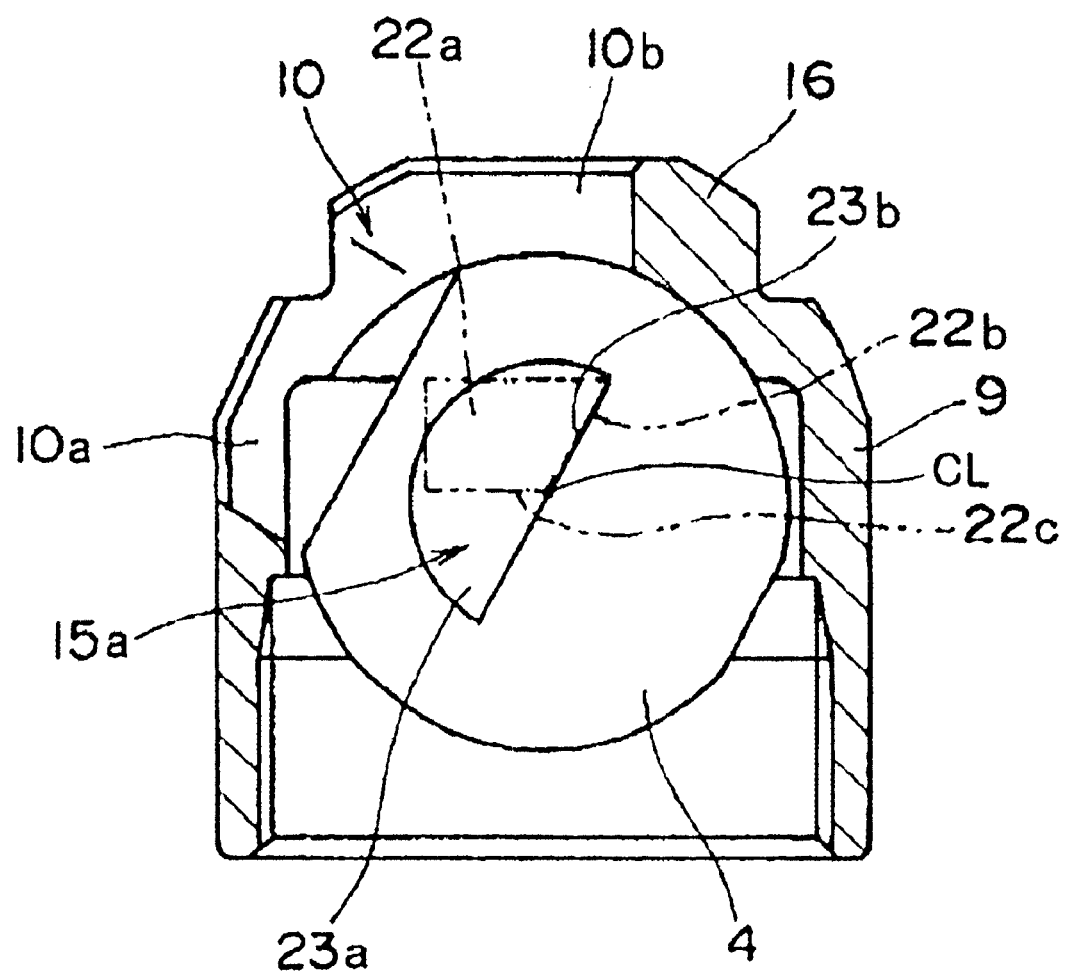
FIG. 8 is a longitudinal sectional view of the valve holding casing in which the ball valve is installed and positioned at a male coupler receiving rotational position.

The female coupler 1 has, as can best be seen in FIG. 2, a cylindrical coupler body 8 having a through hole 5, a lower end (as viewed in FIG. 2) or rearward end of which is adapted for connection with a pipe (not shown), a ball valve 4 having a through hole 3 and a valve holding casing 9 threadably connected to the cylindrical coupler body 8 and disposed around the ball valve 4 to hold the ball valve rotatably.

The through hole 5 of the coupler body 8 has a large diameter portion 5a and a small diameter portion 5b formed successively from the forward end towards the rearward end thereof. In the large diameter portion 5a, there is provided a cylindrical sealing member 6 having a through hole 6a which is coaxial with the through hole 5. The sealing member 6 is made from a resin. The sealing member 6 is formed with an annular groove 6b in the outer surface near the rearward end thereof and has an annular portion 6c provided at its rearward end and which extends rearward so as to sealingly engage with the inner surface of the small diameter portion 5b. In the annular groove 6b, there is provided a resilient ring 18 which acts on the sealing member 6 to urge a forward end surface or valve support surface 7 of the sealing member 6 against the outer spherical surface of the ball valve 4. The resilient ring may be an O-ring, a small diameter coil spring formed in the shape of a ring, or the like. The valve support surface 7 of the cylindrical sealing member 6 has an inner annular raised sealing portion 20a and an outer annular raised sealing portion 20b interposing an annular recess 19 therebetween. The inner and outer annular raised sealing portions 20a and 20b are coaxial with the through hole 6a of the cylindrical sealing member 6. A sealing sleeve 14 is inserted in the through hole 3 of the ball valve 4 to be in an interference-fit with an irregular interior surface 21 of the through hole 3, whereby the sealing sleeve 14 is securely held in the through hole 3.

The valve holding casing 9 has an elongated through hole 10 extending from a left side (as viewed in FIG. 2) to a top portion or forward end portion of the valve holding casing 9. The elongated through hole 10 includes a large width portion 10a positioned at the left side portion of the valve holding casing 9 and a small width portion 10b extending from the large width portion 10a to the top portion of the valve holding casing 9. The large width portion enables a cylindrical male member 11 of the male coupler 2 formed with a large diameter pulling-out-prevention portion 11a to be inserted into the through hole 3 of the ball valve 4 which is positioned at a male coupler receiving rotational position shown in FIGS. 2 and 17, and the small width portion 1b allows the cylindrical male member 11 of the male coupler inserted into the through hole 3 of the ball valve 4 to be rotated to a male coupler securing rotational position shown in FIG. 18. As is apparent from FIGS. 2, 17 and 18, when the ball valve 4 is positioned at the male coupler receiving rotational position, the through hole 3 of the ball valve 4 is out of alignment with and fluidly disconnected from the through hole 5 of the coupler body 8, and when the ball valve 4 is positioned at the male coupler securing rotational position, the through hole 3 of the ball valve 4 becomes aligned with and fluidly connected to the through hole 5 of the coupler body 8.

Figure 18:
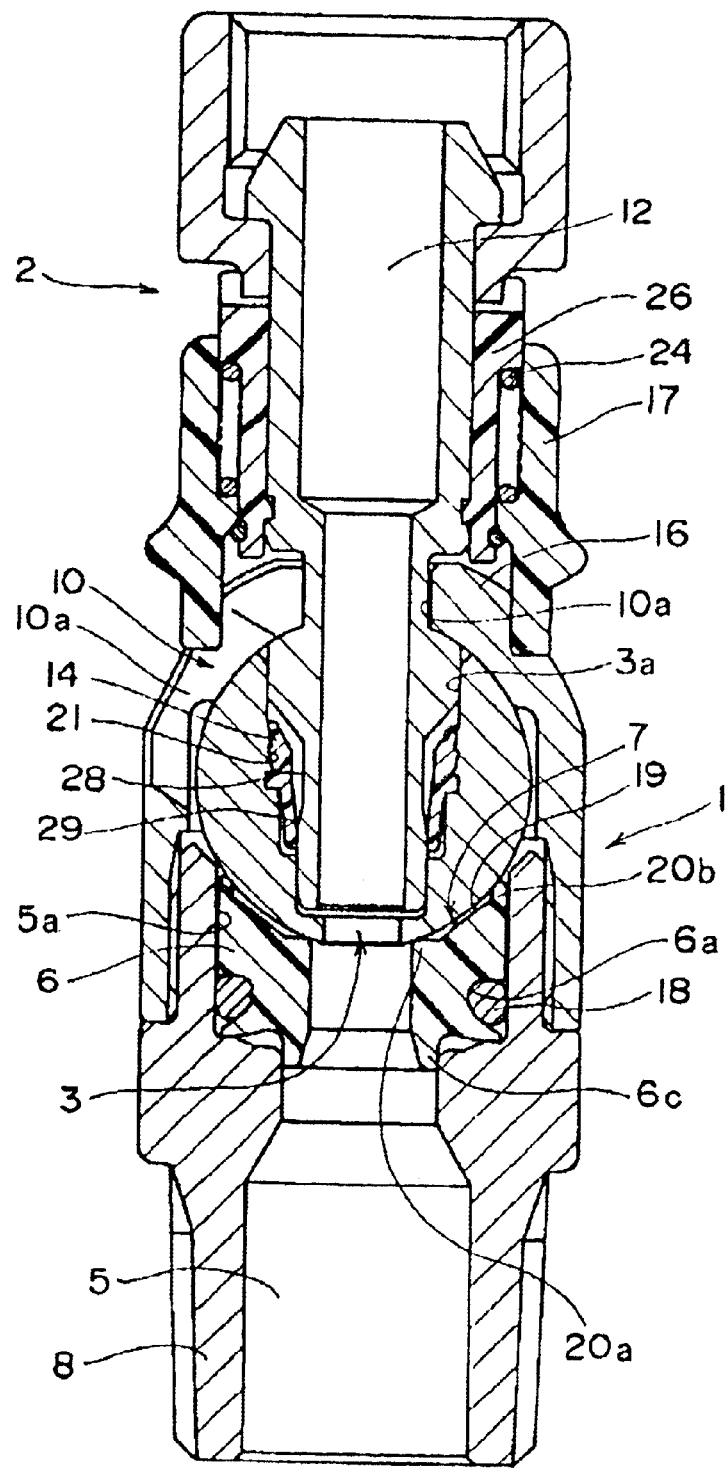
FIG. 18 is a longitudinal cross-sectional view of the fluid coupler showing the male coupler in the male coupler securing rotational position.
Figure 19:
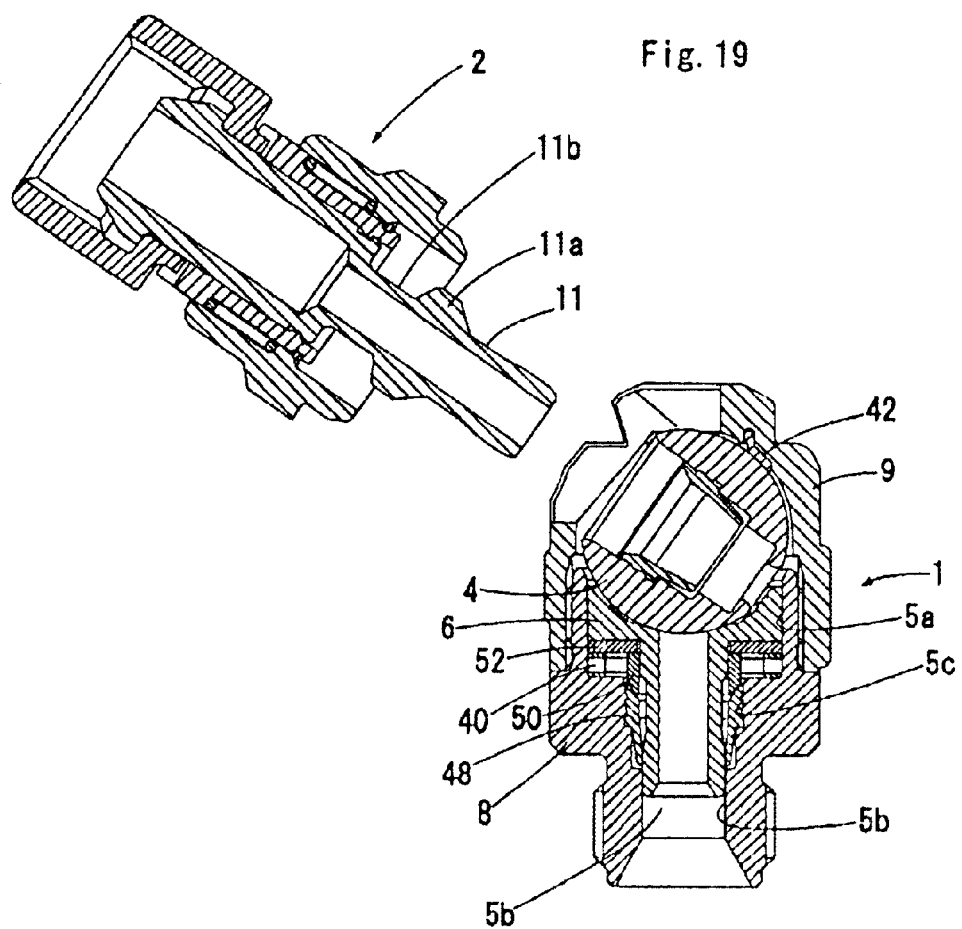
FIG. 19 is a longitudinal sectional view of a fluid coupler in accordance with a second embodiment of the present invention wherein male and female couplers have not yet been connected.
Figure 20:
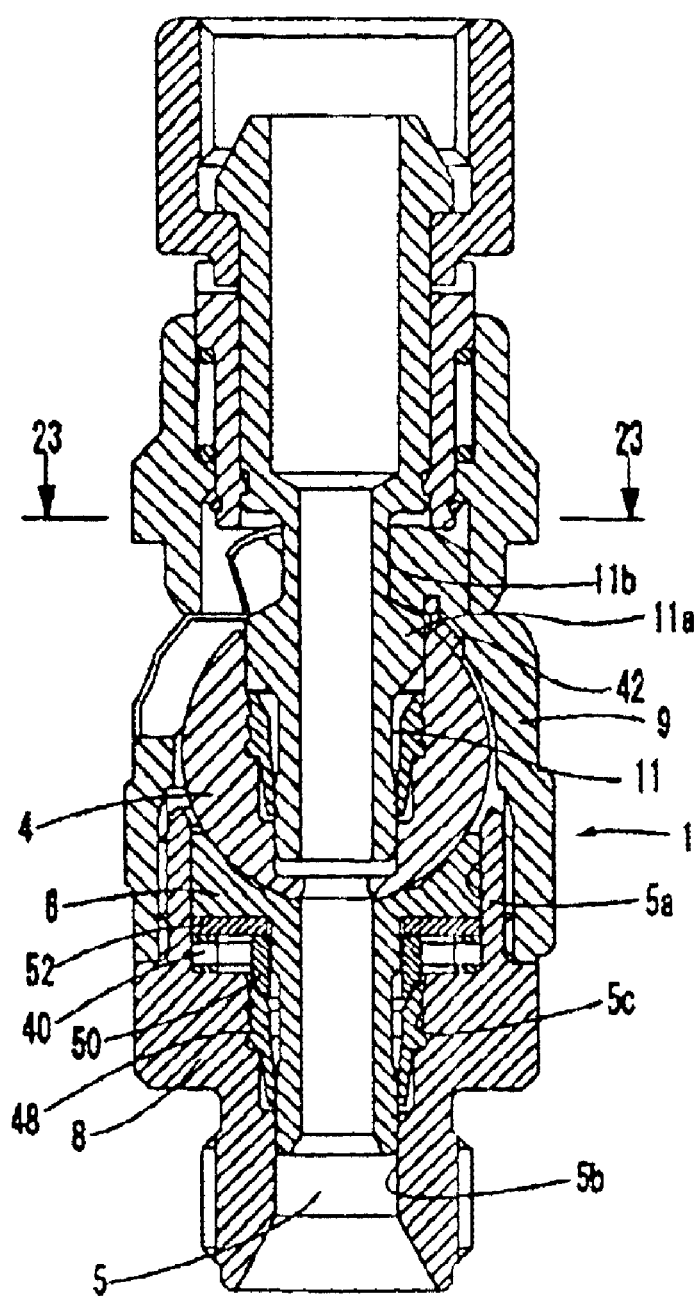
FIG. 20 is a longitudinal sectional view of the fluid coupler of the second embodiment in which the male coupler has been inserted into the female coupler and moved to the male coupler securing rotational position.

The inner and outer raising sealing portions 20 and 20b are spaced away from each other such that the rearward end opening of the through hole 3 of the ball valve 4 can not extend from the radially outer side of the outer annular raised sealing portion 20b and the radially inner side of the inner annular raised sealing portion 20a, to prevent the fluid in the through hole 5 of the coupler body 8 from flowing outside the outer annular sealing ring 20b while the ball valve 4 is rotated between the male coupler receiving position (FIGS. 2 and 17) and the male coupler securing position (FIG. 18).

The female coupler 1 is provided with a ball valve rotation control mechanism 15. The ball valve rotation control mechanism 15 comprises, as shown in FIGS. 4–9, a pair of recesses 15a, 15a formed in the ball valve 4 and a pair of raised portions 15b, 15b formed on the interior surface of the valve holding casing 9 and received in the corresponding recesses 15a, 15a.

The recesses 15a, 15a are defined by first flat sliding surfaces 22a, 22a, which are formed on opposite sides of a spherical outer surface of the ball valve 4 relative to an axis of the through hole 3 and which extend normal to the rotational axis CL around which the ball valve 4 is rotated between the male coupler receiving position (FIGS. 2 and 17) and the male coupler securing position (FIG. 18), and flat stop surfaces 23b extending from the respective first flat sliding surfaces 23a, 23a to the spherical outer surface of said ball valve 4. The stop surfaces 23b lie in a plane containing the rotational axis CL of the ball valve 4.

The raised portions 15b, 15b have second flat sliding surfaces 22a, 22a extending in parallel and slidably engaged with the corresponding first flat sliding surfaces 23a, 23a and first flat sides 22b, 22b and second flat sides 22c, 22c intersecting the first flat sides 22b, 22b at an angle x of about 45 degrees.

Figure 9:
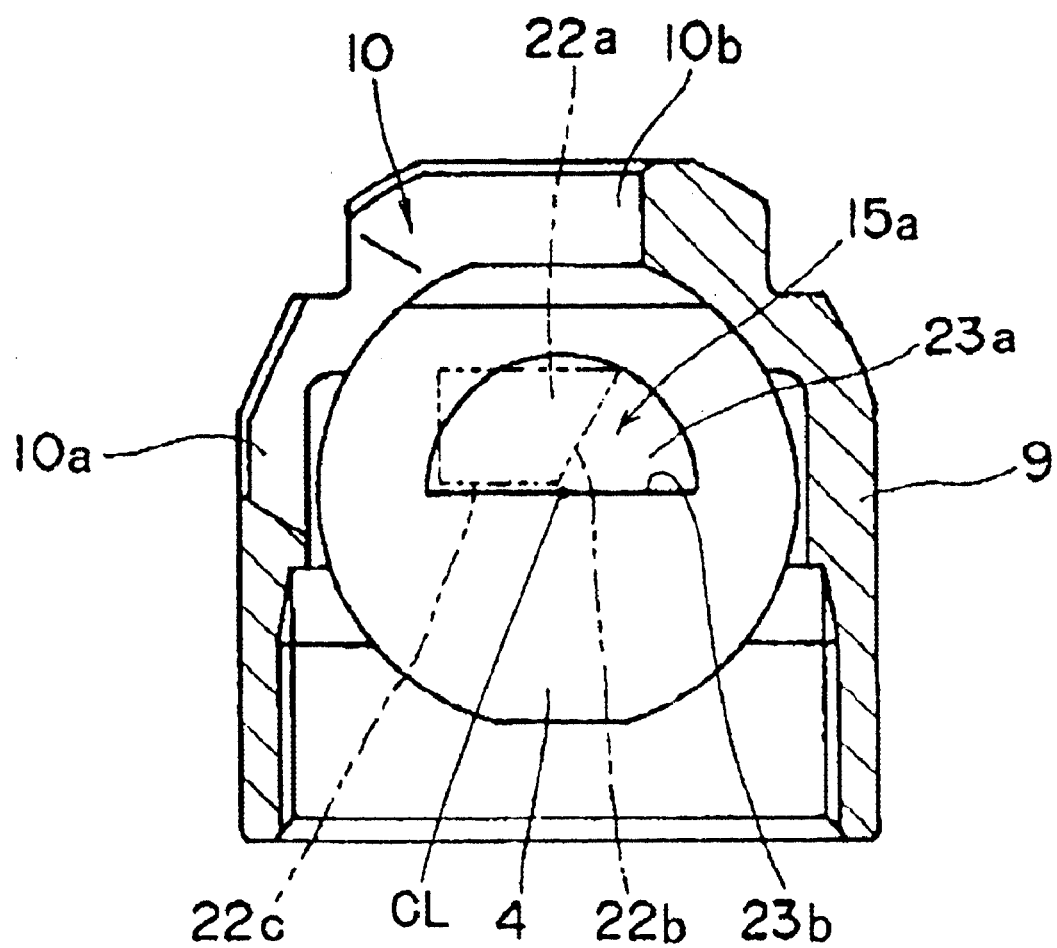
FIG. 9 is a view similar to FIG. 8 wherein the ball valve is positioned at a male coupler securing rotational position.
Figure 10:
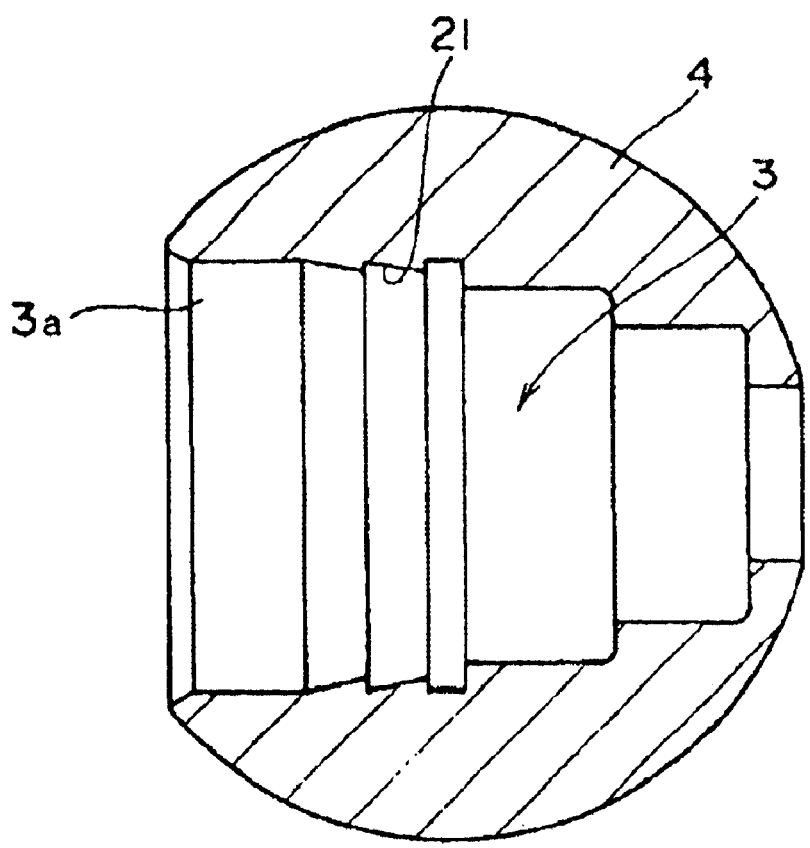
FIG. 10 is a longitudinal cross-sectional view of the ball valve.
Figure 11:
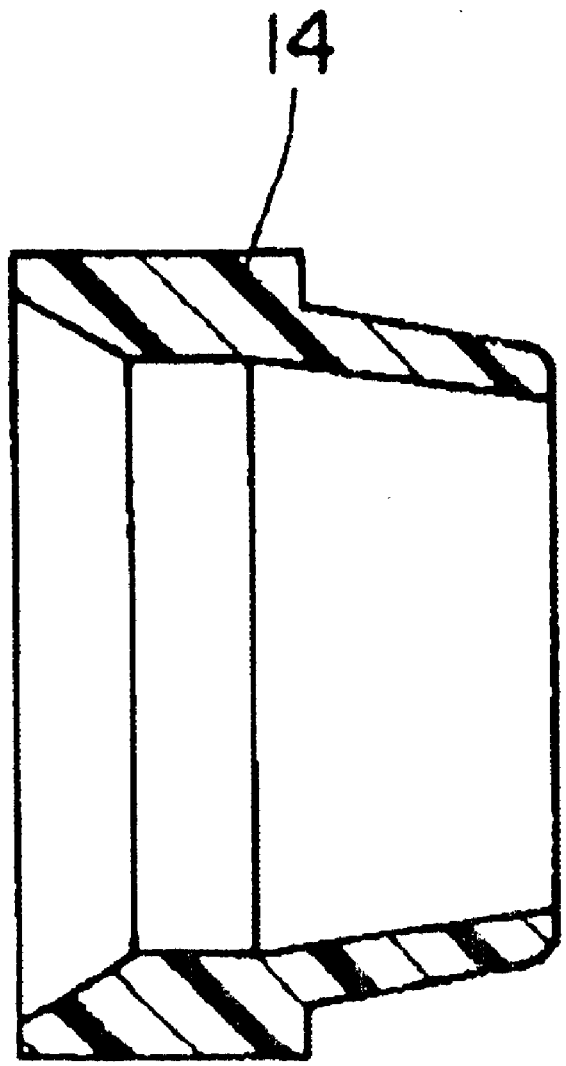
FIG. 11 is a longitudinal cross-sectional view of a sealing sleeve provided in the fluid coupler in accordance with the present invention.
Figure 12:
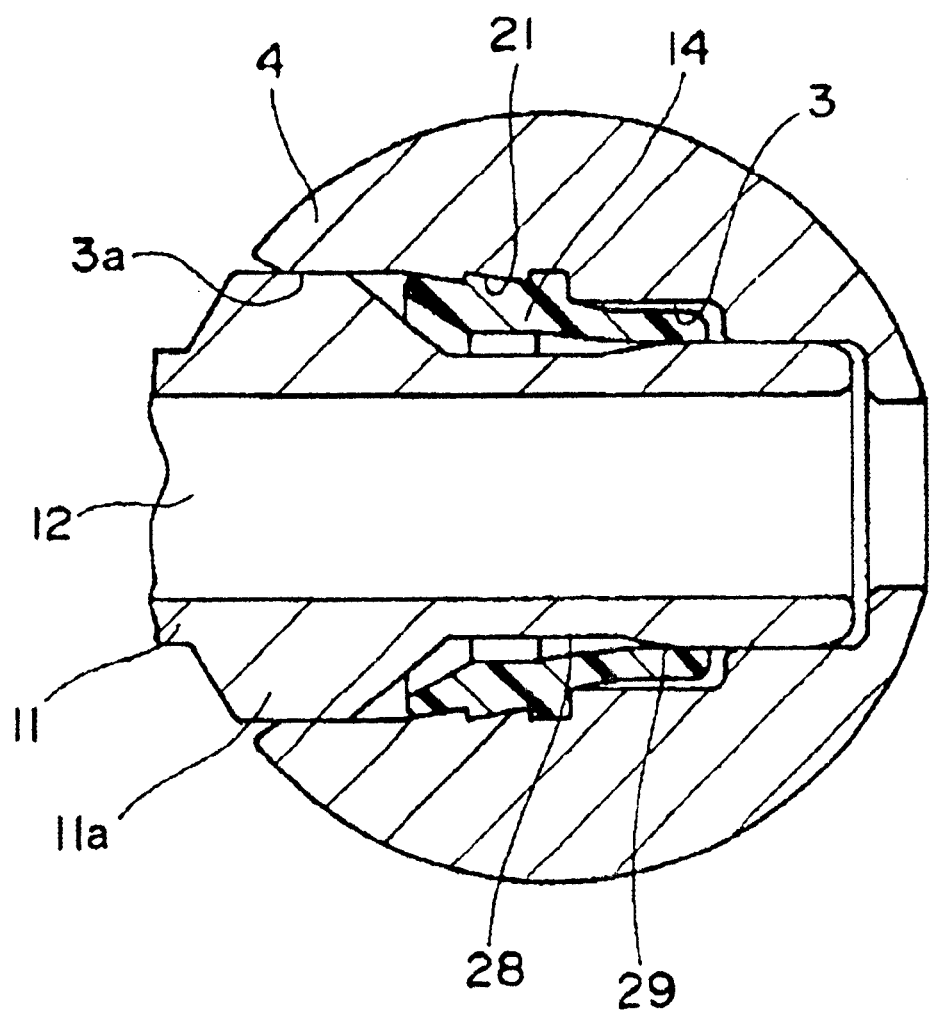
FIG. 12 is a view showing a positional relationship between a cylindrical male member of the male coupler and the sealing sleeve provided in the ball valve.
Figure 13:
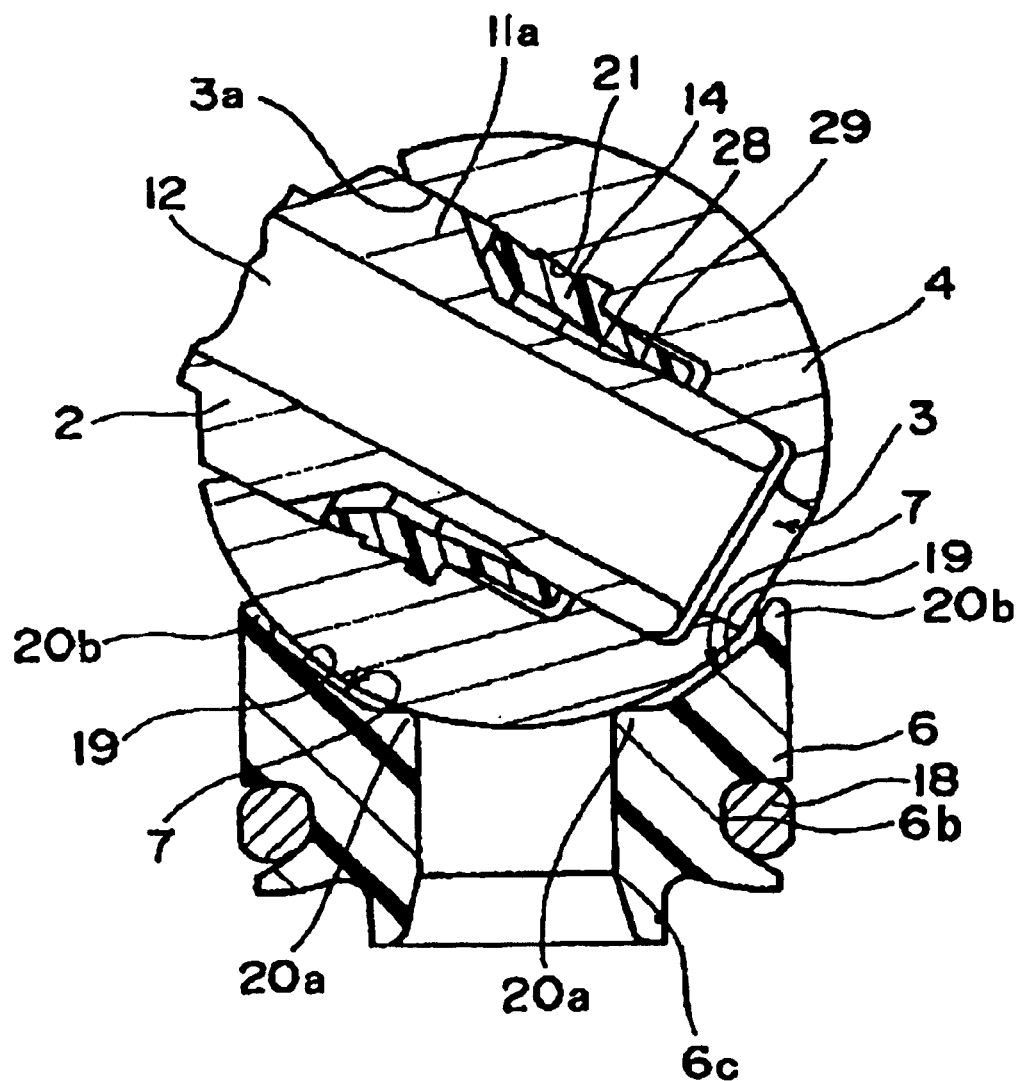
FIG. 13 is a view showing a positional relationship between a cylindrical sealing ring and the ball valve with the cylindrical male member of the male coupler received therein and positioned at the male coupler receiving rotational position.
Figure 14:
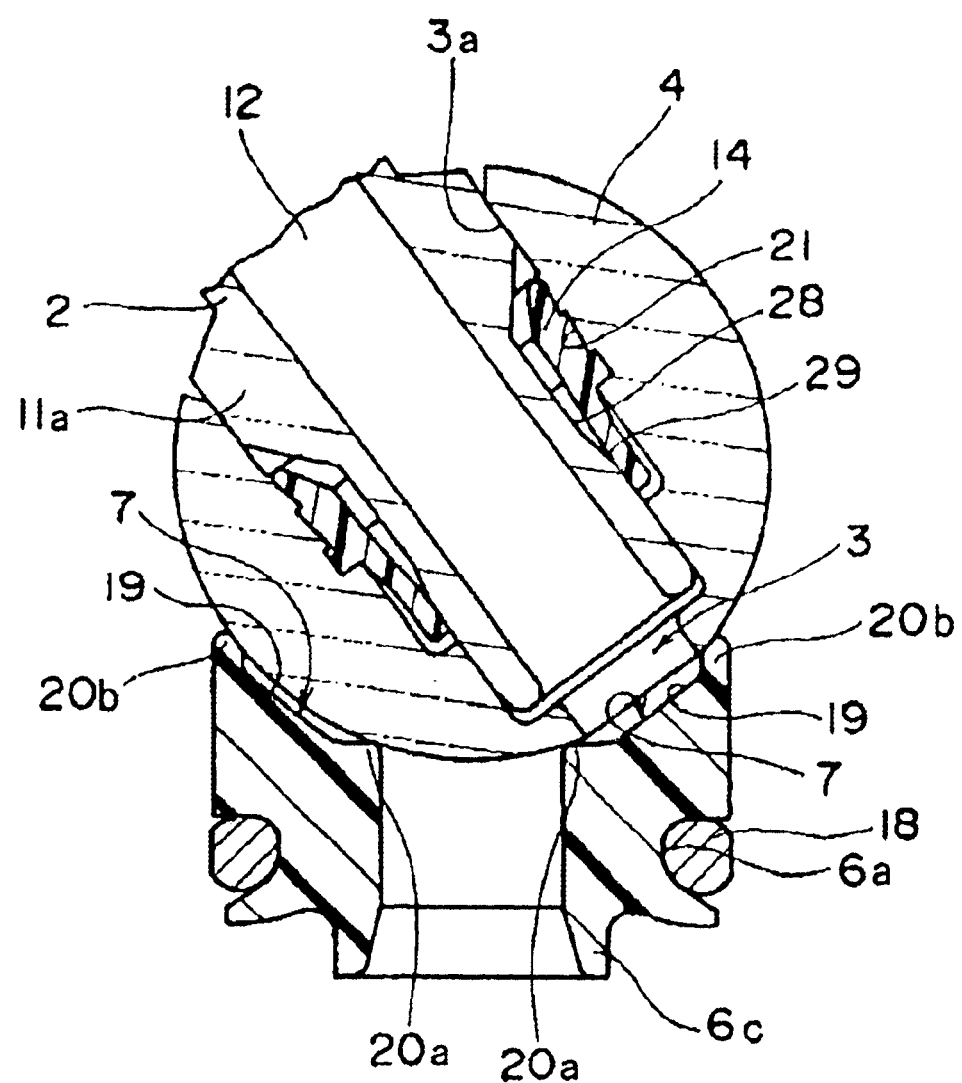
FIG. 14 is a view similar to FIG. 13 wherein the ball valve with the cylindrical male member received therein has been moved from the male coupler receiving rotational position towards the male coupler securing rotational position.
Figure 15:
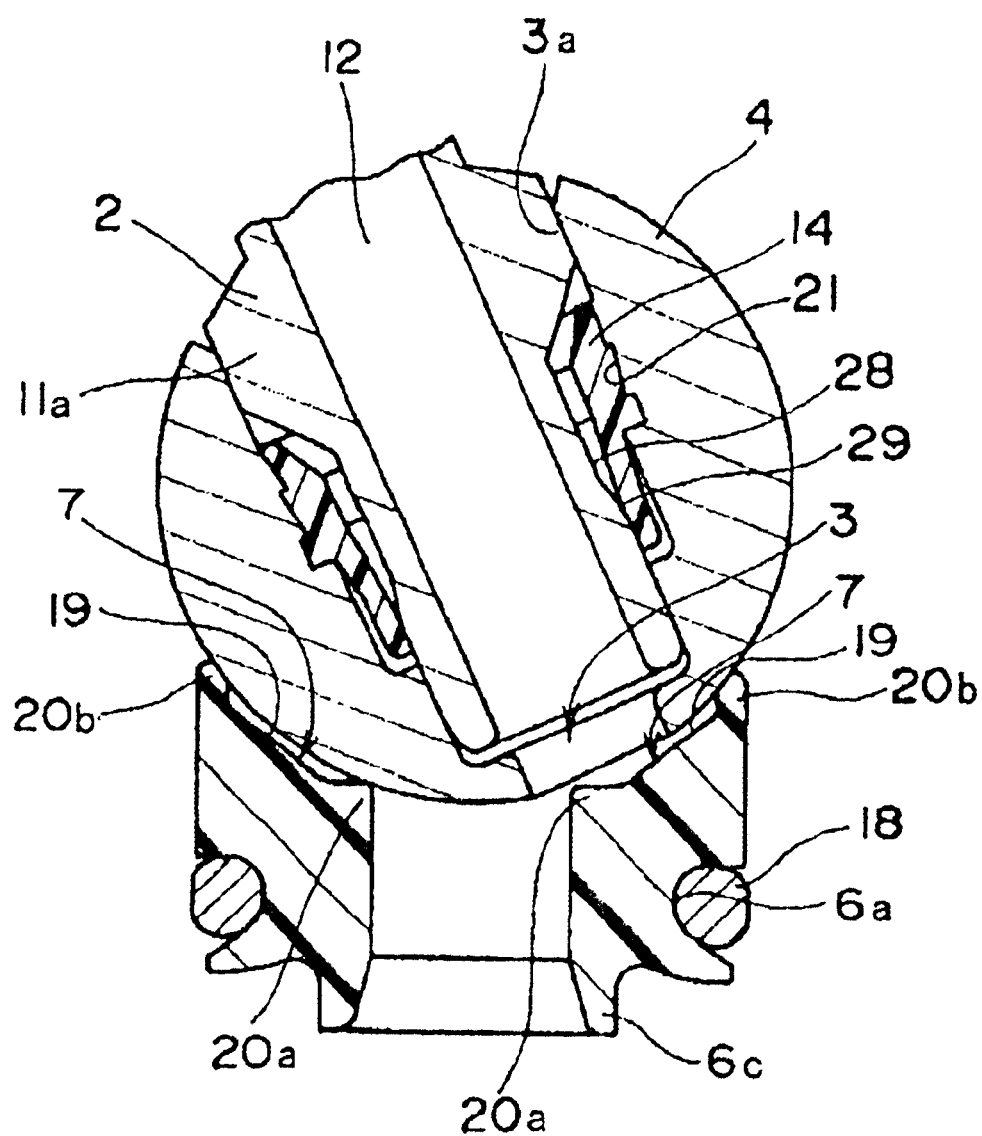
FIG. 15 is a view similar to FIG. 14 wherein the ball valve with the cylindrical male member received therein has been further moved from the male coupler receiving rotational position towards the male coupler securing rotational position.
Figure 16:
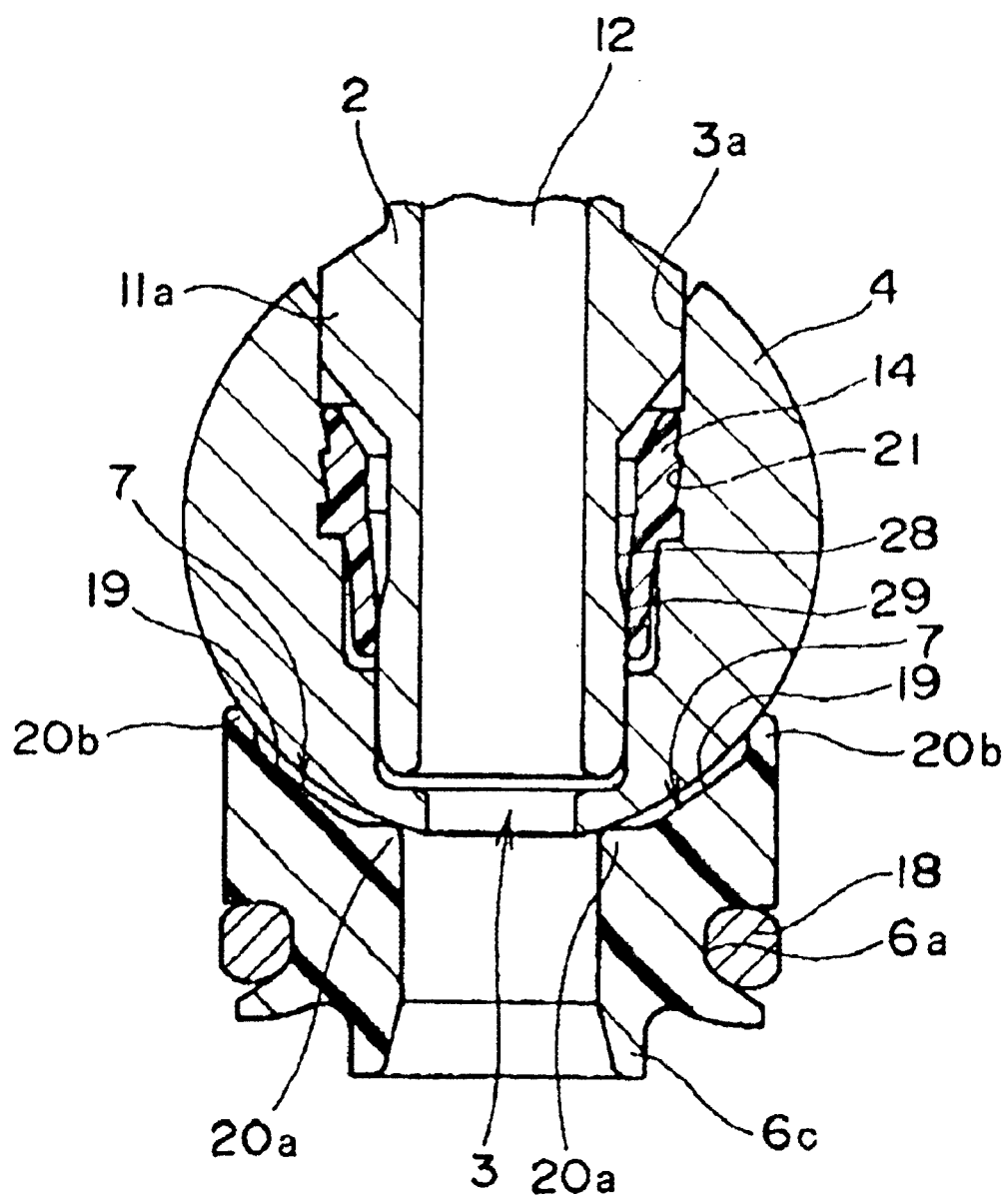
FIG. 16 is a view similar to FIG. 15 wherein the ball valve with the cylindrical male member received therein has been moved to the male coupler securing position.

The first flat sliding surface 23a, 23a of the recesses 15a, 15a cooperate with the second flat sliding surface 22a, 22a of the raised portions 15b, 15b to allow the ball valve 4 to rotate only around the rotational axis CL so that the forward end or male coupler receiving end 3a of the through hole 3 of the ball valve 4 can move only along the elongated through hole 10 of the valve holding casing 9. The flat stop surfaces 23b of the recesses 15a, 15a are adapted to be engaged by the first flat sides 22b, 22b of the raised portions 15b, 15b when the ball valve 4 has been moved to the male coupler receiving rotational position from the male coupler securing rotational position (FIG. 8) and is adapted to be engaged by the second flat sides 22c, 22c when the ball valve 4 has been moved to the male coupler securing rotational position from the male coupler receiving rotational position (FIG. 9).

The fluid coupler further has a locking means for locking the male coupler 2 with the ball valve positioned at the male coupler securing rotational position. The locking means comprises a locking sleeve 17 (FIGS. 3, 17 and 18) axially slidably mounted on the cylindrical male member 11 and a projection 16 formed on the forward end of the valve holding casing 9. When the male coupler 2 is positioned at the male coupler securing rotational position (FIG. 18), the locking sleeve 17 is axially forwardly moved on the male coupler to engage with the projection 16 of the valve holding casing 9 to keep the male coupler at the male coupler securing rotational position. By moving the locking sleeve 17 rearwards to disengage from the projection 16, the male coupler can be moved from the male coupler securing position.

The male coupler 2 has a cylindrical male coupler cover 26 fixedly connected to the cylindrical male member 11 and the locking sleeve 17 is coaxially and slidably mounted on the male coupler cover 26. Between the cylindrical male coupler cover 26 and the locking sleeve 17, there is a coil spring which urges the locking sleeve 17 forwards. When the fluid coupler is used for transferring paint, the cylindrical male member 11 and the locking sleeve 17 are formed from a material which is resistant to adhesion of the paint thereto to prevent the locking sleeve 17 from becoming clogged due to setting of the paint.

The cylindrical male member 11 has a large diameter tip end portion 29 and a small diameter portion 28 adjacent to the tip end portion 29 so that when the cylindrical male member is inserted into the through hole 3 of the ball valve 4, the cylindrical male member 11 engages with the sealing sleeve 14 over a small limited area of the large diameter portion to generate a large sealing force between the sealing sleeve 14 and the cylindrical male member 11.

Figure 23:
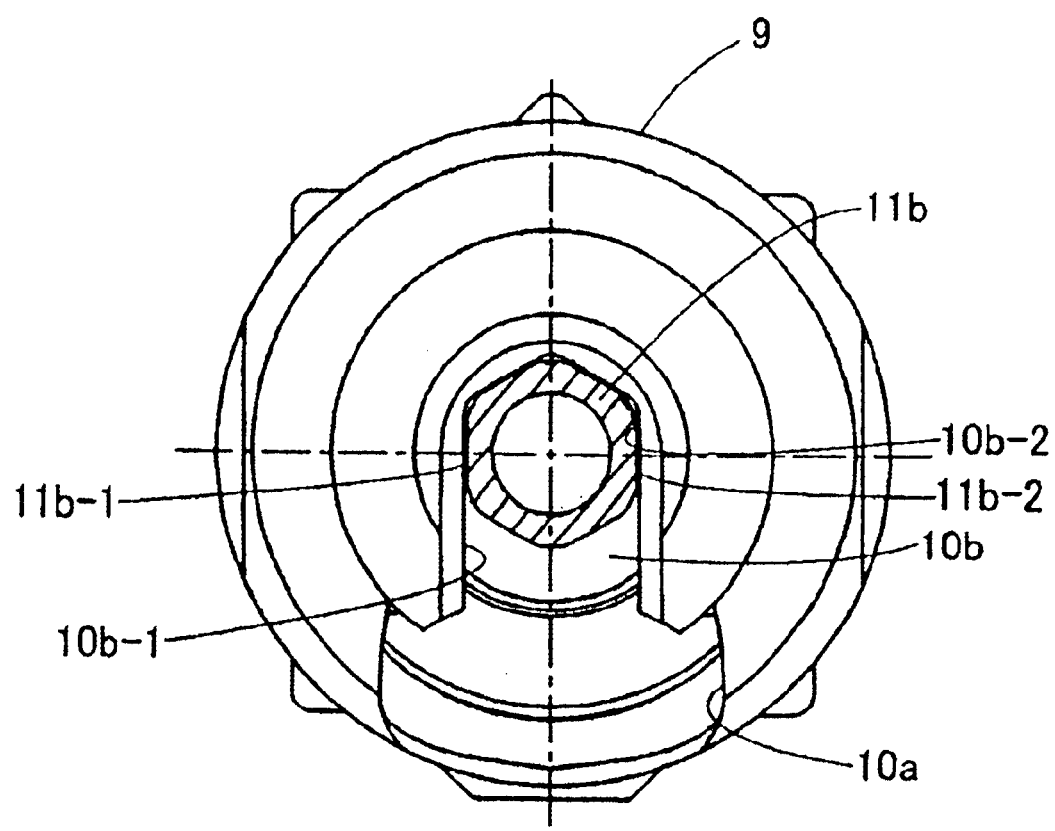
FIG. 23 is a view taken along a line 22—22 of FIG. 20 in which, for the sake of clarity, a locking sleeve of the male coupler is omitted.
Figure 24:
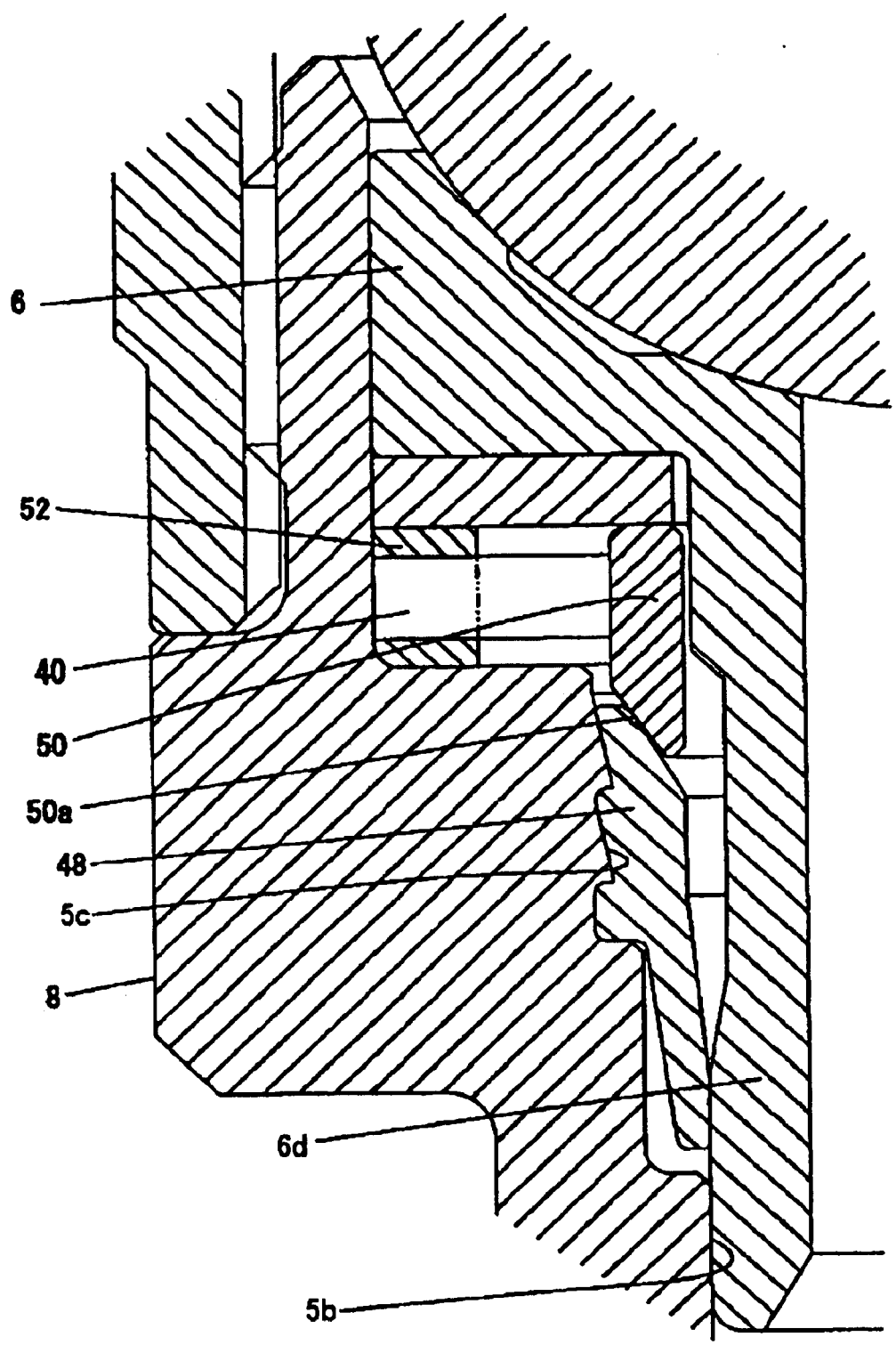
FIG. 24 is an enlarged view of a part of the fluid coupler shown in FIG. 20.

FIGS. 19–24 show a fluid coupler in accordance with a second embodiment of the present invention. As is apparent from the figures, the fluid coupler of the second embodiment is generally the same as that of the first embodiment in construction. As compared with the first embodiment, the fluid coupler of the second embodiment has the following differences:

firstly, a compressed coil spring 40 is provided in a through hole 5 of a female coupler 8 to urge a cylindrical sealing member 6 against a ball valve 4;

secondly, a valve support member 42 is provided on the interior surface of a valve holding casing 9 which cooperates with the cylindrical sealing member 6 to rotatably support the ball valve 4;

thirdly, a male member 11 of a male coupler 2 is formed with a rotation-prevention portion 11b which, as shown in FIG. 23, has a cross section having sides 11b-1, 11b-2 parallel with side edges 10b-1, 10b-2 defining a guide portion 10b of an elongated through hole 10 of the valve holding casing 9; and, lastly, the cylindrical sealing member 6 has a cylindrical small diameter portion 6d extending into a small diameter portion 5b of the through hole 5 of the coupler body 8 and a sealing sleeve 48 is provided in an intermediate diameter portion 5c of the through hole 5 formed between the cylindrical small diameter portion 5b and a large diameter portion 5a.

The compressed coil spring 40 can maintain a constant pressure between the cylindrical sealing member 6 and the ball valve 4 even if the modulus of elasticity of the cylindrical sealing member 6 decreases due to, for example, an exposure to excessive high temperature, extended use and so on.

Figure 21:
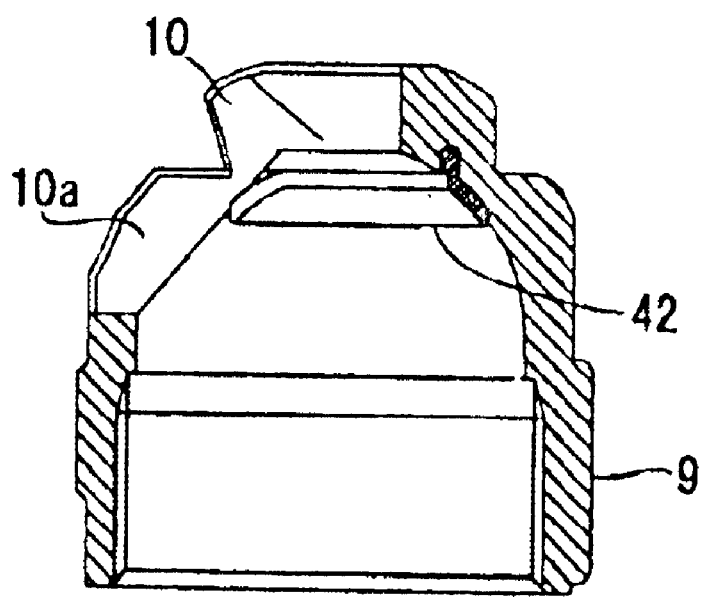
FIG. 21 is a longitudinal sectional view of a valve holding casing of the second embodiment.
Figure 22:
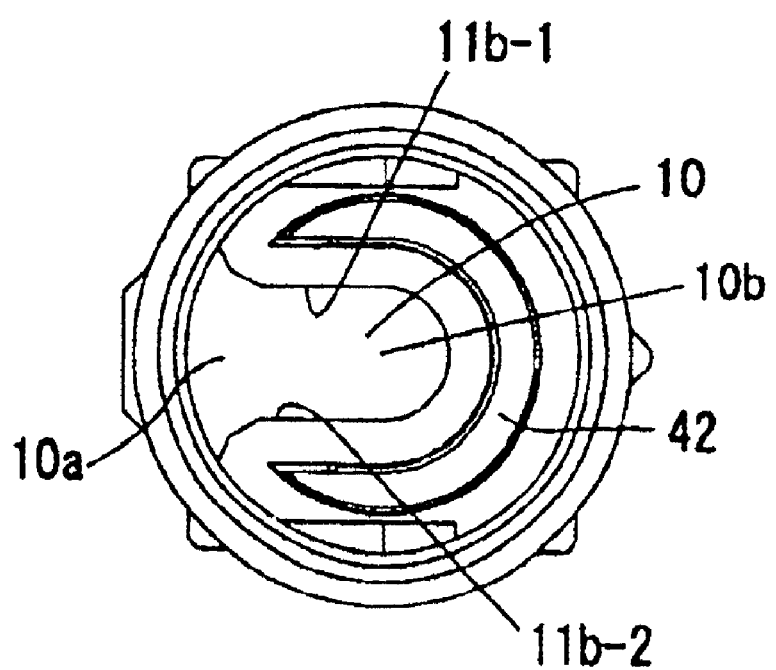
FIG. 22 is a bottom view of the valve holding casing of FIG. 21.

The valve support member 42 is, as shown in FIGS. 21 and 22, U-shaped and enables the ball valve 4 to be rotatably supported without any contact of the ball valve 4 with the interior surface of the valve holding casing 9, thereby decreasing wear rate of the outer spherical surface of the ball valve 4 and the interior surface of the valve holding casing 9.

The sealing sleeve 48 is securely connected to the interior surface of the intermediate diameter portion 5b and sealingly engages with the outer surface of the cylindrical small diameter portion 6d in the same manner as the sealing sleeve 14 in the first embodiment with regards to the interior surface of the through hole 3 of the ball valve 4 and the outer surface of the male member 11 of the male coupler. In the second embodiment, however, there is provided an additional fastening member 50 which is positioned between the sealing sleeve 48 and an annular plate 52 placed on the rearward end surface of the cylindrical sealing member 6. As can best be seen in FIG. 24, the fastening member 50 is cylindrical and has a conical surface or wedge surface 50a engaged with an end portion of the interior of the sealing sleeve 48. If the sealing sleeve is subjected to a pressure of a fluid leaking from the through hole 5 of the coupler body 8 through a possible gap between the outer surface of the cylindrical small diameter portion 6d and the interior surface of the small diameter portion 5b of the through hole 5, the sealing sleeve 48 may be displaced rearwards (upwards as viewed in FIG. 24). In such a case, the conical or wedge surface 50a of the fastening member 50 will urge the forward end of the sealing sleeve 48 against the interior surface of the intermediate diameter portion 5b to positively hold the sealing member 48 on the interior surface 5b of the through hole 5.

Figure 25:
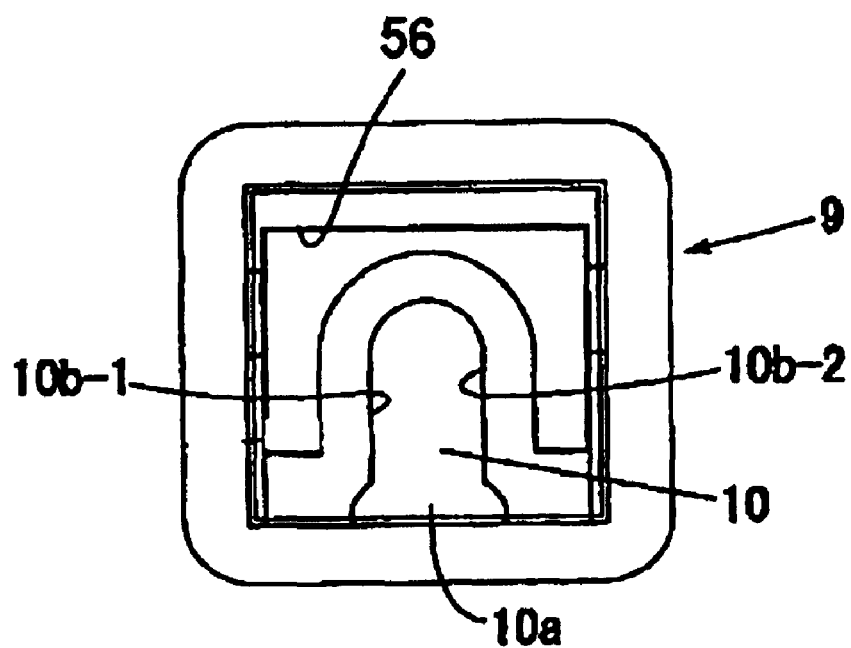
FIG. 25 is a bottom view of a valve holding casing of a coupler in accordance with a third embodiment of the present invention.
Figure 26:
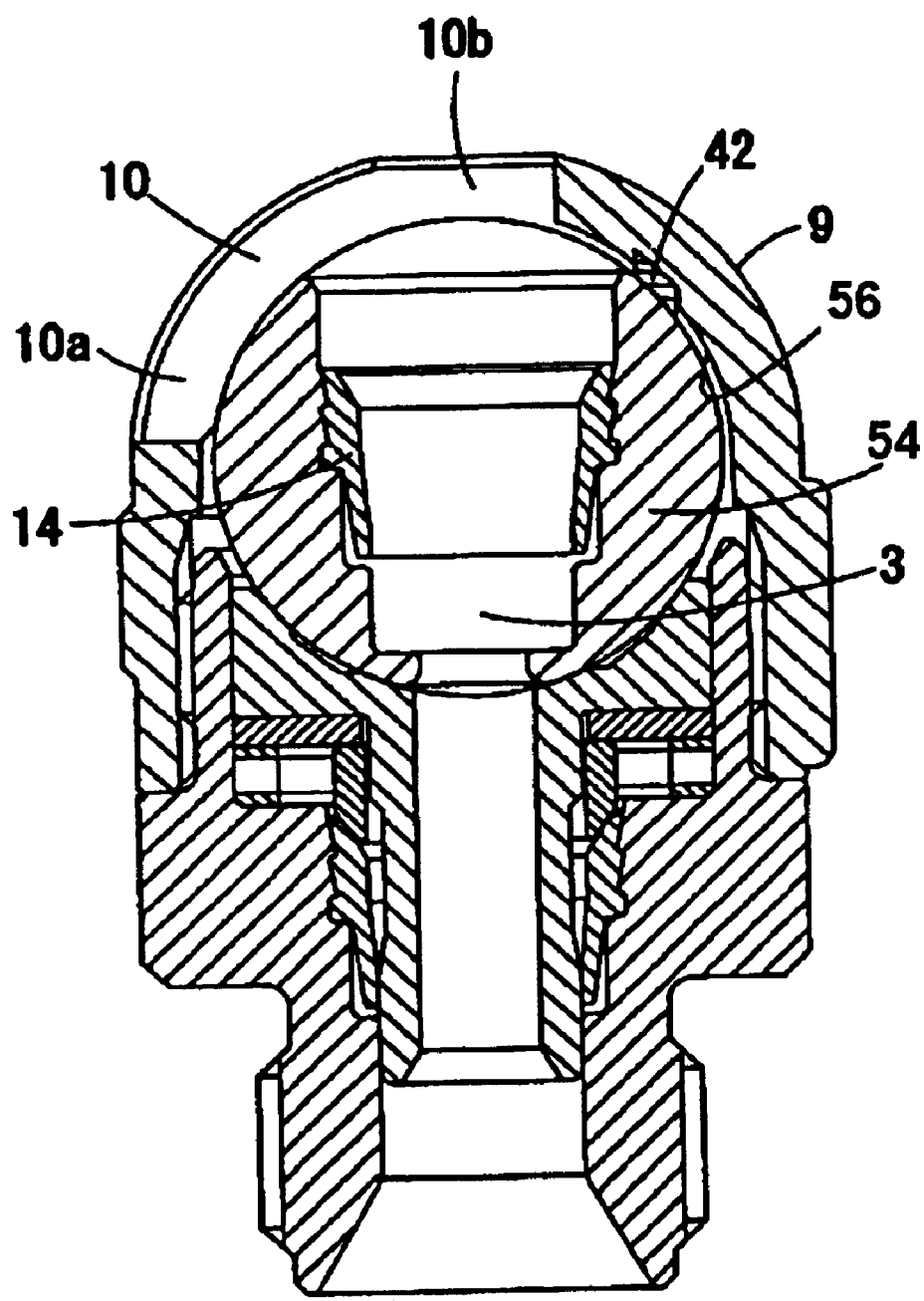
FIG. 26 is a partial longitudinal view of a valve holding casing of the third embodiment with a cylindrical valve installed therein.

FIGS. 25 and 26 show a further embodiment of the present invention in which a cylindrical valve 54 is used in place of the ball valve in the previous embodiments. FIG. 25 is a bottom view of a valve holding casing 9 of the fluid coupler of the third embodiment having a space 56 in which a cylindrical valve 54 is to be installed. Except for the shapes of the space 56 and the valve member 54 being different from those in the aforementioned embodiments, the construction of the fluid coupler of the third embodiment is the same as that of the other embodiments. In these figures, the same elements are denoted by the same reference numerals used in the other embodiments.

Figure 27:
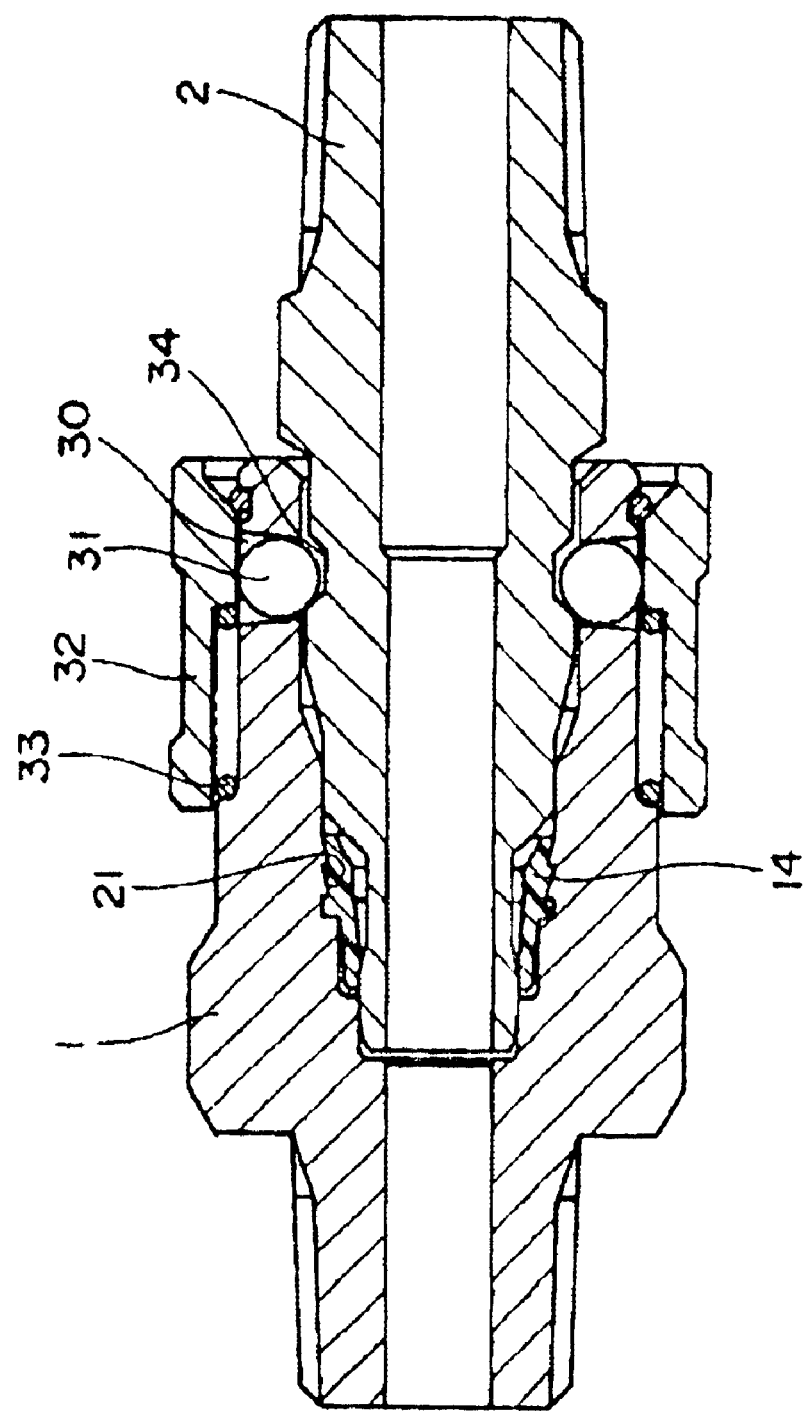
FIG. 27 is a view showing another type of fluid coupler in which a sealing sleeve similar to that in the above stated fluid couplers is employed.
Figure 28:
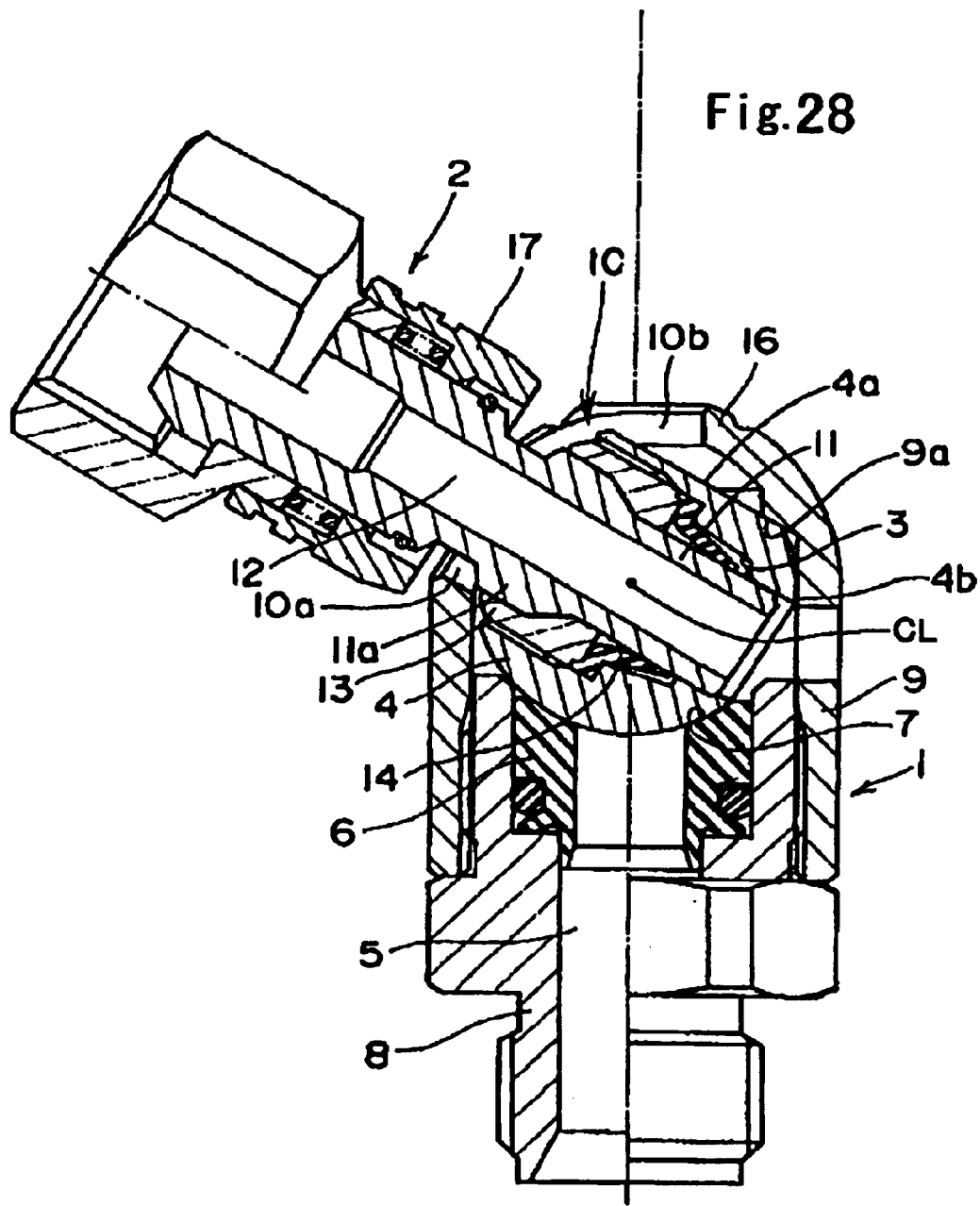
FIG. 28 is a longitudinal cross sectional view of a prior art fluid coupler.

FIG. 27 shows a fluid coupler in accordance with another embodiment of the present invention. The fluid coupler is of a different type from those of the above-stated embodiments. As compared with the prior art fluid coupler, the fluid coupler of the fourth embodiment is characterized in that a sealing sleeve 14 is securely fastened to an interior surface of a through hole of a female coupler 1 by an interference-fit thereof with an irregular interior surface 21 of the through hole. The female coupler 1 of this embodiment has a locking ball 31 to be engaged with an annular groove 34 formed in the outer surface of the male coupler 2. The locking ball 31 is received in a radial through hole 30 formed in the female coupler 1 and adapted to be urged into the annular groove 34 by a sleeve 32 biased by a coil spring 33.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A fluid coupler comprising:
a female coupler; and,
a male coupler adapted to be inserted into and connected to said female coupler;
said female coupler comprising:
  a cylindrical coupler body having a first axial end and a second axial end, said cylindrical coupler body further having a first through hole extending from said first axial end to said second axial end, said first axial end being adapted for connection with a conduit;
  a ball valve including a second through hole having a first axial opening end and a second axial opening end, said ball valve being positioned at said second axial end of said cylindrical coupler body such that said ball valve is rotatable around a rotational axis extending through a center of said ball valve between a first rotational position wherein said first axial opening end of said second through hole is in alignment with and fluidly connected with said first through hole and a second rotational position wherein said first axial opening end is out of alignment with and fluidly disconnected from said first through hole; and,
  a valve holding casing connected to said cylindrical coupler body and disposed around said ball valve to rotatably hold it, said valve holding casing having an elongated through hole provided along a path along which said second axial opening end of said second through hole moves when said ball valve is moved between said first and second rotational positions, said elongated through hole allowing said male coupler to be inserted into said second through hole from the outside of said valve holding casing through said second axial opening end of said second through hole when said ball valve is in said second rotational position and allowing said male coupler which has been inserted into said second through hole between said first and second rotational positions;
said ball valve having a first flat sliding surface formed on a spherical outer surface of said ball valve which extends in a direction normal to said rotational axis, and a flat stop surface raised from said first flat sliding surface and reaching said spherical outer surface of said ball valve, the first flat sliding surface and the flat stop surface together defining a recess;
said valve holding casing having an interior surface and an alignment portion formed on said interior surface and extending into said recess, said alignment portion having a second flat sliding surface extending in parallel and slidably engaged with said first flat sliding surface;
said flat stop surface being adapted to engage with said alignment portion when said ball valve has been moved to a first one of said first and second rotational positions from a second one said first and second rotational positions to stop the rotational movement of said ball valve.

2. A fluid coupler as set forth in claim 1 wherein:
said flat stop surface is adapted to engage said alignment portion when said ball valve has been moved to said first rotational position from said second rotational position to stop the rotational movement of said ball valve; and,
said flat stop surface is also adapted to engage said alignment portion when said ball valve has been moved to said second rotational position from said first rotational position to stop the rotational movement of said ball valve.

3. A fluid coupler as set forth in claim 2 wherein:
said flat stop surface is flat and lies in a plane containing said rotational axis; and
said alignment portion has a first flat side adapted to be engaged by said flat stop surface when said ball valve has been moved to said first rotational position from said second rotational position, and a second flat side adapted to be engaged by said flat stop surface when said ball valve has been moved to said second rotational position from said first rotational position.

4. A fluid coupler as set forth in claim 3 wherein:
said first and second flat sides intersect at said rotational axis at a predetermined angle.

5. A fluid coupler as set forth in claim 1 wherein:
said ball valve has an interior surface defining said second through hole and an irregular portion formed in said interior surface; and
said fluid coupler further comprises a sealing sleeve securely held to said interior surface defining said second through hole by interference-fit of the outer surface of said sealing sleeve with said irregular portion of said interior surface, said sealing sleeve being adapted to sealingly engage with the outer surface of said male coupler inserted into said second through hole.

6. A fluid coupler as set forth in claim 1 wherein:
said cylindrical coupler body further comprises a cylindrical valve sealing member positioned in said first through hole of said cylindrical coupler body at said second axial opening end of said first through hole, and having a third through hole axially aligned with said first through hole;
said cylindrical valve sealing member has a valve support surface which is provided with inner and outer annular raised sealing portions extending coaxially with said third through hole and sealingly engaged with said spherical outer surface of said ball valve; and,
said inner and outer annular raised sealing portions are spaced away from each other such that the third through hole can not extend from the radially outer side of the outer annular raised sealing portion to the radially inner side of the inner annular raised sealing portion, thereby avoiding leakage of the fluid in the first through hole via the third through hole when the ball valve is rotated between the first and second rotational positions.

7. A fluid coupler as set forth in claim 1 wherein:
said first through hole of said cylindrical coupler body has a large diameter portion and a small diameter portion successively arranged from said second axial opening end towards said first axial opening end, and a radially extending portion provided between and connecting said large and small diameter portions; and,
said fluid coupler further comprising in said large diameter portion a cylindrical valve sealing member having a third through hole axially aligned with said first through hole and a spring placed between said cylindrical valve sealing member and said radially extending portion to urge said cylindrical valve sealing member against said ball valve.

8. A fluid coupler as set forth in claim 7 wherein:
said valve holding casing has a valve support member provided on said interior surface thereof for engagement with said outer spherical surface of said ball valve and to cooperate with said cylindrical valve sealing member to rotatably hold said ball valve therebetween.

9. A fluid coupler as set forth in claim 8 wherein:
said cylindrical valve sealing member has a valve support surface which is provided with inner and outer annular raised sealing portions extending coaxially with said third through hole and sealingly engaged with said spherical outer surface of said ball valve; and
said inner and outer annular raised sealing portions are spaced away from each other such that the third through hole can not extend from the radially outer side of the outer annular raised sealing portion to the radially inner side of the inner annular raised sealing portion, thereby avoiding leakage of the fluid in the first through hole via the third through hole when the ball valve is rotated between the first and second rotational positions.

10. A fluid coupler as set forth in claim 9 wherein:
said elongated through hole has a male coupler inserting portion for allowing said male coupler to be inserted into said second through hole from the outside of said valve holding casing through said second axial opening end of said second through hole when said ball valve is in said second rotational position and a male coupler guide portion for allowing said male coupler inserted into said second through hole to move between said first and second rotational positions, said male coupler guide portion being defined by side edges extending along said path; and
said male coupler comprises a rotation-prevention portion which is positioned between said side edges defining said elongated hole when said male coupler inserted into said female coupler is moved between said first and second rotational positions and has a cross section configured such that said rotation-prevention portion is prevented from rotating around an axis thereof by engagement of said rotation-prevention portion with said side edges.

11. A fluid coupler as set forth in claim 1 wherein:
said male coupler comprises a cylindrical male coupler cover fixedly mounted on and surrounding the male coupler; and
a cylindrical locking member coaxially and slidably mounted on the cylindrical male coupler cover so that the cylindrical locking member is movable between a securing position, wherein the cylindrical locking member engages with the valve holding casing for prevention of movement of the male coupler inserted into the ball valve positioned at the first rotational position, and a non-securing position, wherein the cylindrical locking member disengages from the valve holding casing to allow the male coupler inserted into the ball valve to move between the first rotational position and the second rotational positions;
said cylindrical male coupler cover and said cylindrical locking member being made from material which is resistant to adhesion of a fluid which is transferred through the fluid coupler.

12. A fluid coupler as set forth in claim 7 wherein:
said small diameter portion of said first through hole has a first portion and second portion successively arranged in a direction from said large diameter portion towards said first axial opening end of said first through hole, the second portion being smaller than the first portion in diameter;

said cylindrical valve sealing member has an end surface directed towards said first axial opening end of said first through hole and a cylindrical small diameter portion extending from said end surface through said first portion of said small diameter portion into said second portion of the same; and said fluid coupler further comprises:

a cylindrical sealing sleeve having a cylindrical fastening portion sealingly secured to an interior surface of said first portion and a cylindrical sealing portion extending from said cylindrical fastening portion radially inwardly to sealingly engage with an outer surface of said cylindrical small diameter portion; and a cylindrical wedge member provided around said cylindrical small diameter portion of said cylindrical valve sealing member and between said end surface of said cylindrical valve sealing member and said cylindrical sealing sleeve, said cylindrical wedge member having a conical wedge surface and the diameter of which is gradually reduced in a direction towards said one axial opening end of said first through hole and engaging with an interior surface of said sealing sleeve.

13. A fluid coupler comprising:

a female coupler; and a male coupler adapted to be inserted into and connected to said female coupler;

said female coupler comprising:

a cylindrical coupler body having a firswt axial end and a second axial end, said cylindrical coupler body further having a first through hole extending from said first axial end to said second axial end and adapted for connection with a conduit;

a ball valve including a second through hole extending through said ball valve and having a first axial opening end and a second axial opening end, said ball valve being positioned at said other axial end of said cylindrical coupler body such that said ball valve is rotatable around a rotational axis extending through a center of said ball valve between a first rotational position wherein said first axial opening end of said second through hole is in alignment with said first through hole and a second rotational position wherein said first axial opening end is out of alignment with said first through hole; and a valve holding casing connected to said cylindrical coupler body and displaced around said ball valve to rotatably hold it, said valve holding casing having an elongated through hole provided along a path along which said second axial opening end of said second through hole moves when said ball valve is moved between said first and second rotational positions, said elongated through hole having a male coupler inserting portion for allowing said male coupler to be inserted into said second through hole from the outside of said valve holding casing through said other axial opening end of said second through hole when said ball valve is in said second rotational position and a male coupler guide portion for allowing said male coupler inserted into said second through hole to move between said first and second rotational positions, said male coupler guide portion being defined by side edges extending along said path;

said first through hole of said cylindrical coupler body having a large diameter portion and a small diameter portion successively arranged from said second axial opening end towards said first axial opening end and a radially extending portion provided between and connecting said large and small diameter portions;

said fluid coupler further comprising a cylindrical valve sealing member received in said large diameter portion of said first through hole and having a third through hole axially aligned with said first through hole, and a spring positioned between said cylindrical valve sealing member and said radially extending portion to urge said cylindrical valve sealing member against said ball valve.

14. A fluid coupler as set forth in claim 13 wherein:

said male coupler comprises a rotation-prevention portion which is positioned between said side edges defining said elongated hole when said male coupler inserted into said female coupler is moved between said first and second rotational positions and has a cross section configured such that said rotation-prevention portion is prevented from rotating around an axis thereof by engagement of said rotation-prevention portion with said side edges.

15. A fluid coupler as set forth in claim 14 wherein:

said cross section has two parallel sides in parallel with said side edges to be slidably engaged with said side edges when said ball valve with said male coupler is moved between said first and second rotational positions.

16. A fluid coupler as set forth in claim 13 wherein:

said valve holding casing has a valve support member provided on said interior surface thereof for engagement with said outer spherical surface of said ball valve and to cooperate with said cylindrical valve sealing member for rotatably holding said ball valve therebetween.

17. A fluid coupler as set forth in claim 16 wherein:

said cylindrical valve sealing member has a valve support surface which is provided with inner and outer annular raised sealing portions extending coaxially with said third through hole and sealingly engaged with said spherical outer surface of said ball valve; and said inner and outer annular raised sealing portions are spaced away from each other such that the third through hole can not extend from the radially outer side of the outer annular raised sealing portion to the radially inner side of the inner annular raised sealing portion, thereby avoiding an occurrence of leakage of fluid in the first through hole via the third through hole when the ball valve is rotated between the first and second rotational positions.

18. A fluid coupler as set forth in claim 13 wherein:

said male coupler comprises:

a cylindrical male coupler cover fixedly mounted on and surrounding the male coupler; and a cylindrical locking member coaxially and slidably mounted on the cylindrical male coupler cover so that the cylindrical locking member is movable between a securing position, wherein the cylindrical locking member engages with the valve holding casing for prevention of movement of the male coupler inserted into the ball valve positioned at the first rotational position, and a non-securing position, wherein the cylindrical locking member disengages from the valve holding casing to allow the male coupler inserted into the ball valve to move between the first rotational position and the second rotational positions; said cylindrical male coupler cover and said cylindrical locking member being made from material which is resistant to adhesion of a fluid which is transferred through the fluid coupler.

19. A fluid coupler as set forth in claim 13 wherein:

said small diameter portion of said first through hole has a first portion and second portion successively arranged in a direction from said large diameter portion towards said first axial opening end of said first through hole, the second portion being smaller than the first portion in diameter;

said cylindrical valve sealing member has an end surface directed towards said first axial opening end of said first through hole and a cylindrical small diameter portion extending from said end surface through said first portion of said small diameter portion into said second portion of the same; and said fluid coupler further comprises:

a cylindrical sealing sleeve having a cylindrical fastening portion sealingly secured to an interior surface of said first portion and a cylindrical sealing portion extending from said cylindrical fastening portion radially inwardly to sealingly engage with an outer surface of said cylindrical small diameter portion; and a cylindrical wedge member provided around said cylindrical small diameter portion and between said end surface of said cylindrical valve sealing member and said cylindrical sealing sleeve, said cylindrical wedge member having a conical wedge surface and the diameter of which is gradually reduced in a direction towards said first axial opening end of said first through hole and engaging with an interior surface of said sealing sleeve.

20. A fluid coupler comprising:

a female coupler; and a male coupler adapted to be inserted into and connected to said female coupler;

said female coupler comprising:

a cylindrical coupler body having a first axial end and a second axial end, said cylindrical coupler body further having a first through hole extending from said first axial end to said second axial end, said first axial end being adapted for connection with a conduit;

a cylindrical valve including a second through hole transversely extending therethrough having a first axial opening end and a second axial opening end, said cylindrical valve being positioned at said second axial end of said cylindrical coupler body such that a central axis thereof is directed transversely relative to said cylindrical coupler body and said cylindrical valve is rotatable around said central axis thereof between a first rotational position, wherein said first axial opening end of said second through hole is in alignment with and fluidly connected with said first through hole, and a second rotational position, wherein said first axial opening end is out of alignment with and fluidly disconnected from said first through hole; and a valve holding casing connected to said cylindrical coupler body and displaced around said cylindrical valve to rotatably hold it, said valve holding casing having an elongated through hole provided along a path along which said other axial opening end of said second through hole moves when said cylindrical valve is moved between said first and second rotational positions, said elongated through hole having a male coupler inserting portion for allowing said male coupler to be inserted into said second through hole from the outside of said valve holding casing through said second axial opening end of said second through hole when said cylindrical valve is in said second rotational position and a male coupler guide portion for allowing said male coupler inserted into said second through hole to move between said first and second rotational positions, said male coupler guide portion being defined by side edges extending along said path;

said first through hole of said cylindrical coupler body having a large diameter portion and a small diameter portion successively arranged therein from said second axial opening end towards said first axial opening end and a radially extending portion provided between and connecting said large and small diameter portions;

said fluid coupler further comprising a valve sealing member received in said large diameter portion of said first through hole and having a third through hole axially aligned with said first through hole, and a spring positioned between said cylindrical valve sealing member and said radially extending portion to urge said cylindrical valve sealing member against said cylindrical valve.

21. A fluid coupler as set forth in claim 20 wherein:

said male coupler comprises a rotation-prevention portion which is positioned between side edges defining said elongated hole when said male coupler inserted into said female coupler is moved between said first and second rotational positions and has a cross section configured such that said rotation-prevention portion is prevented from rotating around an axis thereof by engagement of said rotation-prevention portion with said side edges.

22. A fluid coupler as set forth in claim 21 wherein:

said cross section has two parallel sides in parallel with said side edges to be slidably engaged with said side edges when said cylindrical valve with said male coupler is moved between said first and second rotational positions.

23. A fluid coupler as set forth in claim 20 wherein:

said valve holding casing has a valve support member provided on said interior surface thereof to engage with a cylindrical outer surface of said cylindrical valve and to cooperate with said cylindrical valve sealing member for rotatably holding said cylindrical valve therebetween.

24. A fluid coupler as set forth in claim 23 wherein:

said cylindrical valve sealing member has a valve support surface which is provided with inner and outer annular raised sealing portions extending coaxially with said third through hole and sealingly engaged with said cylindrical outer surface of said cylindrical valve; and said inner and outer annular raised sealing portions are spaced away from each other such that the third through hole can not extend from the radially outer side of the outer annular raised sealing portion to the radially inner side of the inner annular raised sealing portion, thereby avoiding an occurrence of leakage of the fluid in the first through hole via the third through hole when the cylindrical valve is rotated between the first and second rotational positions.

25. A fluid coupler as set forth in claim 20 wherein:

said male coupler comprises a cylindrical male coupler cover fixedly mounted on and surrounding the male coupler; and a cylindrical locking member coaxially and slidably mounted on the cylindrical male coupler cover so that the cylindrical locking member is movable between a securing position, wherein the cylindrical locking member engages with the valve holding casing for prevention of movement of the male coupler inserted into the cylindrical valve positioned at the first rotational position, and a non-securing position, wherein the cylindrical locking member disengages from the valve holding casing to allow the male coupler inserted into the cylindrical valve to move between the first rotational position and the second rotational positions;

said cylindrical male coupler cover and said cylindrical locking member being made from material which is resistant to adhesion of a fluid which is transferred through the fluid coupler.

26. A fluid coupler as set forth in claim 20 wherein:

said small diameter portion of said first through hole has a first portion and second portion successively arranged in a direction from said large diameter portion towards said first axial opening end of said first through hole, the second portion being smaller than the first portion in diameter;

said cylindrical valve sealing member has an end surface directed towards said first axial opening end of said first through hole and a cylindrical small diameter portion extending from said end surface through said first portion of said small diameter portion into said second portion of said small diameter portion; and said fluid coupler further comprises:

a cylindrical sealing sleeve having a cylindrical fastening portion sealingly secured to an interior surface of said first portion and a cylindrical sealing portion extending from said cylindrical fastening portion radially inwardly to sealingly engage with an outer surface of said cylindrical small diameter portion; and a cylindrical wedge member provided around said cylindrical small diameter portion and between said end surface of said cylindrical valve sealing member and said cylindrical sealing sleeve, said cylindrical wedge member having a conical wedge surface and the diameter of which is gradually reduced in a direction towards said first axial opening end of said first through hole and engaging with an interior surface of said sealing sleeve.

* * * * *